US006898322B2

(12) United States Patent
Semasa

(10) Patent No.: US 6,898,322 B2
(45) Date of Patent: May 24, 2005

(54) CODING METHOD, CODING APPARATUS, DECODING METHOD AND DECODING APPARATUS USING SUBSAMPLING

(75) Inventor: Takayoshi Semasa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 609 days.

(21) Appl. No.: 10/096,944

(22) Filed: Mar. 14, 2002

(65) Prior Publication Data

US 2002/0141649 A1 Oct. 3, 2002

(30) Foreign Application Priority Data

Mar. 28, 2001 (JP) ..................................... 2001-093675

(51) Int. Cl.[7] .............................................. G06K 9/36
(52) U.S. Cl. ..................................................... 382/238
(58) Field of Search ................................. 382/232–233, 382/235–236, 238, 240, 243, 251; 375/240.1, 240.12–240.21, 240.23–240.25; 348/394.1–395.1, 401.1–403.1, 405.1, 407.1–416.1, 422.1, 425.1, 430.1–431.1; 341/52, 65, 107; 707/100, 101

(56) References Cited

U.S. PATENT DOCUMENTS 6,188,793 B1 2/2001 Kimura et al.

FOREIGN PATENT DOCUMENTS

JP 1-051786 A 2/1989
JP 2829954 12/1998

OTHER PUBLICATIONS

"Information Technology—Lossless and near–lossless compression of continuous–tone still images: Baseline" ISO/IEC 14495–1, pp. 1–15 (1999).

ISO/IEC JTC 1/SC 29/WG 1 FCD 14495 Public Draft, Jul. 16, 1997, "Lossless and Near–Lossless coding of Continous Tone Still Images (JPEG–LS)," XP–002260316.

BBC Research Department Report, No. 9, Jul. 1988, pp. 1–13, XP–002138813, "Bandwidth Compression for HDTV Broadcasting: Investigation of Some Adaptive Subsampling Strategies," M.J. Knee et al.

IEEE Tencon, Proceedings of the Region Ten Conference, vol. 3, 10/19–21/93, pp. 938–941, "Adaptive Subsampling For Image Data Compression," W.N. Cheung.

IEEE Transactions on Image Processing, vol. 3, No. 5, Sep. 3, 1994, pp. 492–500, XP000476826, "Spatially Adaptive Subsampling of Image Sequences," R.A.F. Belfor et al.

*Primary Examiner*—Jose L. Couso
(74) *Attorney, Agent, or Firm*—Birch, Stewart, Kolasch & Birch, LLP

(57) ABSTRACT

A coding apparatus includes: a context generator generating a context signal from a reconstructed symbol; a predictor generating a prediction signal indicating a prediction value which is a prediction of a symbol to be coded, based on the context signal, and a prediction error signal which is a difference between the prediction value and the symbol; a quantizer generating a quantized prediction error signal by quantizing the prediction error signal; an encoder coding the quantized prediction error signal by referring to the context signal; an inverse quantizer subjecting the quantized prediction error signal to inverse quantization so as to generate a reconstructed prediction error signal; an inverse predictor subjecting the reconstructed prediction error signal to inverse prediction so as to generate a reconstructed sampled signal; a subsampling control circuit generating a subsampling control signal indicating whether or not the symbol should be subject to subsampling; and an interpolator referring to the subsampling control signal so as to subject to interpolation the reconstructed sampled signal corresponding to the symbol subject to subsampling, wherein the coding apparatus codes symbols while adaptively employing subsampling.

44 Claims, 10 Drawing Sheets

FIG.9

| a | b | c | d | e | f |
|---|---|---|---|---|---|
| g | h | i | j | k | l |
| m | n | o | x | y |   | x: PIXELS TO BE CODED
a~o: REFERENCE PIXELS
y: SUBSEQUENT PIXEL

FIG.11 (PRIOR ART)

CODING METHOD, CODING APPARATUS, DECODING METHOD AND DECODING APPARATUS USING SUBSAMPLING

BACKGROUND OF THE INVENTION

1. Field of the Invention

The present invention generally relates to coding methods, decoding methods, coding apparatuses and decoding apparatuses and, more particularly, to a coding method, a decoding method, a coding apparatus and a decoding apparatus for information source coding and decoding using subsampling.

2. Description of the Related Art

Of two-dimensional signals for which the present invention is adapted, a still image signal composed of Y, Cr and Cb components is taken as an example for description of coding/decoding according to the invention. In coding a still image, signals are often processed by subsampling for reduction of data volume, resulting in the sampling frequency being lowered. For example, the number of sampling points for the Cr and Cb signals may be ½ that of the sampling points of the Y signal. Such a method should however be used only for images containing natural scenery or objects since it produces pseudo colors in colored characters and line drawings. For this reason, subsampling should be selected adaptively when an image contains a mixture of natural scenery or objects, characters and computer graphics and the like.

FIG. 10 is a flowchart showing a subsampling process performed by an encoder according to the related disclosed in Japanese Laid-Open Patent Application No. 1-51786.

A description will now be given of the operation according to the related art. FIG. 11 shows an area of a two-dimensional field or frame of a digital image signal to be transmitted. In FIG. 11, pixels of an original image to be coded are indicated by ○, ●, □, Δ and ×. A horizontal interval between pixels corresponds to a sampling period and a vertical interval corresponds to a line interval.

Referring to the flowchart of FIG. 10, in step ST101, basic pixels of an original image indicated by ○ are transmitted. In step ST102, a pixel indicated by ● is predicted by determining an average of two basic pixels indicated by ○ above and below the pixel indicated by ●In step ST103, a comparison is made between the prediction value and the original pixel indicated by ●. If it is determined that a prediction error exceeds a threshold level, control is turned to step ST105. If the prediction error is below the threshold level, control is turned to step ST104. In step ST105, 1 is transmitted as bitmap data and the original pixel indicated by ● is transmitted. In step ST104, the pixel indicated by ● is replaced by the prediction value for pixel-skipping. 0 is transmitted as bitmap data.

In steps ST106 through ST108 and ST109, a prediction value a pixel indicated by □ is determined from two pixels indicated by ○ and ● to the right and left. A comparison is made between the prediction value and the original pixel data, whereupon the pixel indicated by □ is replaced by the prediction value or the original pixel is transmitted, depending on the result of comparison.

In steps ST110 through ST112 and ST113, a prediction value for a pixel indicated by Δ is determined from two pixels indicated by ○ and ● to the right and left or two pixels indicated by □. A comparison is made between the prediction value and the original pixel data, whereupon the pixel indicated by A is replaced by the prediction value or the original pixel is transmitted, depending on the result of comparison.

In steps ST114 through ST116 and ST117, a prediction value for a pixel indicated by × is determined from two pixels indicated by ○ and □ to the right and left, two pixels indicated by Δ to the right and left, or two pixels ● and □ to the right and left. A comparison is made between the prediction value and the original pixel data, whereupon the pixel indicated by × is replaced by the prediction value or the original pixel is transmitted, depending on the result of comparison.

In the related-art coding, of a plurality of pixels temporarily and spatially arranged, regularly arranged basic pixels are coded without being skipped. Pixels other than the basic pixels may be skipped by subsampling or coded using the original data. A determination as to whether a target pixel should be skipped or coded using original data is based on the magnitude of a prediction error occurring when the pixel is subject to interpolation using an average of two pixels above and below or two pixels to the right and left of the target pixel. If the prediction error exceeds a threshold level, the target pixel is coded using the original data. If the prediction error is below the threshold level, the pixel is no coded. The pixel not coded is replaced at a decoding end by an average value.

Thus, the related-art coding apparatus bases its operation on identifying regularly arranged signals and subjecting the other signals to adaptive sampling by determining the magnitude of prediction errors.

Since a determination as to whether subsampling should be performed is based on the magnitude of a prediction error, a relatively large increase in the threshold level for effective subsampling may result in insufficient reconstruction of characters and line drawings containing important information at the edges thereof.

In the related-art coding apparatus, basic pixels are subject to predictive coding. Accordingly, two types of prediction, extrapolation prediction for basic pixels and interpolation prediction for the other pixels, are required, resulting in a disadvantage in that the construction of the apparatus becomes complex and the coding performance cannot be improved beyond a certain level.

SUMMARY OF THE INVENTION

Accordingly, a general object of the present invention is to provide a coding apparatus, a decoding apparatus, a coding method and a decoding apparatus and a decoding method in which the aforementioned disadvantages are eliminated.

Another and more specific object is to provide a coding apparatus, a decoding apparatus, a coding method and a decoding method capable of efficiently coding and decoding information with variable local characteristics.

The aforementioned objects are achieved by a coding apparatus comprising: a context generator (1) generating a context signal (101) from a reconstructed symbol (109); a predictor (2) generating a prediction signal (106) indicating a prediction value which is a prediction of a symbol (102) to be coded, based on the context signal (101), and a prediction error signal (103) which is a difference between the prediction value and the symbol (102); a quantizer (3) generating a quantized prediction error signal (104) by quantizing the prediction error signal (103); an encoder (4) coding the quantized prediction error signal (104) by referring to the context signal (101); an inverse quantizer. (5) subjecting the quantized prediction error signal (104) to inverse quantization so as to generate a reconstructed prediction error signal (107); an inverse predictor (6) subjecting the reconstructed prediction error signal (107) to inverse prediction so as to generate a reconstructed sampled signal (108); a subsampling control circuit (8) generating a subsampling control signal (110) indicating whether or not the symbol (102) should be subject to subsampling; and an interpolator (7) referring to the subsampling control signal (110) so as to subject to interpolation the reconstructed sampled signal (108) corresponding to the symbol (102) subject to subsampling, wherein the coding apparatus codes symbols while adaptively employing subsampling.

The aforementioned objects are also achieved by a decoding apparatus comprising: a context generator (1) generating a context signal (101) from a reconstructed symbol (109); a predictor (2) generating a prediction signal (106) which is a prediction of a symbol (102) to be decoded, based on the context signal (101); a decoder (6) decoding prediction error coded data (105) by referring to the context signal (101) so as to generate a quantized prediction error signal (104); an inverse quantizer (5) subjecting the quantized prediction error signal (104) to inverse quantization so as to generate a reconstructed prediction error signal (107); an inverse predictor (6) subjecting the reconstructed prediction error signal (107) to inverse prediction so as to generate a reconstructed sampled signal (108); a subsampling control circuit (8) determining whether the prediction error coded data (105) is subjected to subsampling at a coding end, based on the context signal (101), and generating a subsampling control signal (110) indicating whether interpolation should be performed; and an interpolator (7) subjecting to interpolation the reconstructed sampled signal (108) corresponding to the prediction error coded data (105) determined to be subjected to subsampling at the coding end, by referring to the subsampling control signal (110), wherein the decoder performs decoding of the prediction error coded data adaptively subjected to subsampling at the coding end.

The aforementioned objects are also achieved by a coding method comprising: a context generating step for generating a context signal (101) from a reconstructed symbol (109); a prediction step for generating a prediction signal (106) which is a prediction of a symbol to be coded, based on the context signal (101), and a prediction error signal (103) which is a difference between the prediction value and the symbol to be coded; a quantizing step for quantizing the prediction error signal (103) so as to generate a quantized prediction error signal (104); a coding step for coding the quantized prediction error signal (104) by referring to the context signal (101); an inverse quantization step for subjecting the quantized prediction error signal (104) to inverse quantization so as to generate a reconstructed prediction error signal (107); an inverse prediction step for subjecting the reconstructed prediction error signal (107) to inverse prediction so as to generate the reconstructed sampled signal (108); a subsampling control step for generating a subsampling control signal (110) for determining whether the symbol (102) should be subject to subsampling; and an interpolation step for subjecting to interpolation the reconstructed sampled signal (108) corresponding to the symbol (102) subject to subsampling, wherein the coding method codes samples while adaptively employing subsampling.

The aforementioned objects are also achieved by a decoding method comprising: a context generating step for generating a context signal (101) from a reconstructed symbol (109); a predicting step for generating a prediction signal (106) which is a prediction of a symbol (102) to be decoded, based on the context signal (101); a decoding step for decoding prediction error coded data (105) by referring to the context signal (101) so as to generate a quantized prediction error signal (104); an inverse quantization step for subjecting the quantized prediction error signal (104) to inverse quantization so as to generate a reconstructed prediction error signal (107); an inverse prediction step for subjecting the reconstructed prediction error signal (107) to inverse prediction so as to generate a reconstructed sampled signal (108); a subsampling control step for determining whether the prediction error coded data (105) is subjected to subsampling at a coding end, based on the context signal (101), and generating a subsampling control signal (110) indicating whether interpolation should be performed; and an interpolating step for reconstructing a signal determined to be subjected to subsampling at the coding end, by referring to the subsampling control signal (110), wherein the decoding method performs decoding of the prediction error coded data adaptively subjected to subsampling at the coding end.

BRIEF DESCRIPTION OF THE DRAWINGS

Other objects and further features of the present invention will be apparent from the following detailed description when read in conjunction with the accompanying drawings, in which:

FIG. 9 is a schematic diagram showing a target pixel x to be coded, reference pixels a–o, and a subsequent pixel y;

FIG. 11 shows an area of a two-dimensional field or frame of a digital image signal to be transmitted.

DETAILED DESCRIPTION OF THE PREFERRED EMBODIMENTS

First Embodiment

Figure 1:
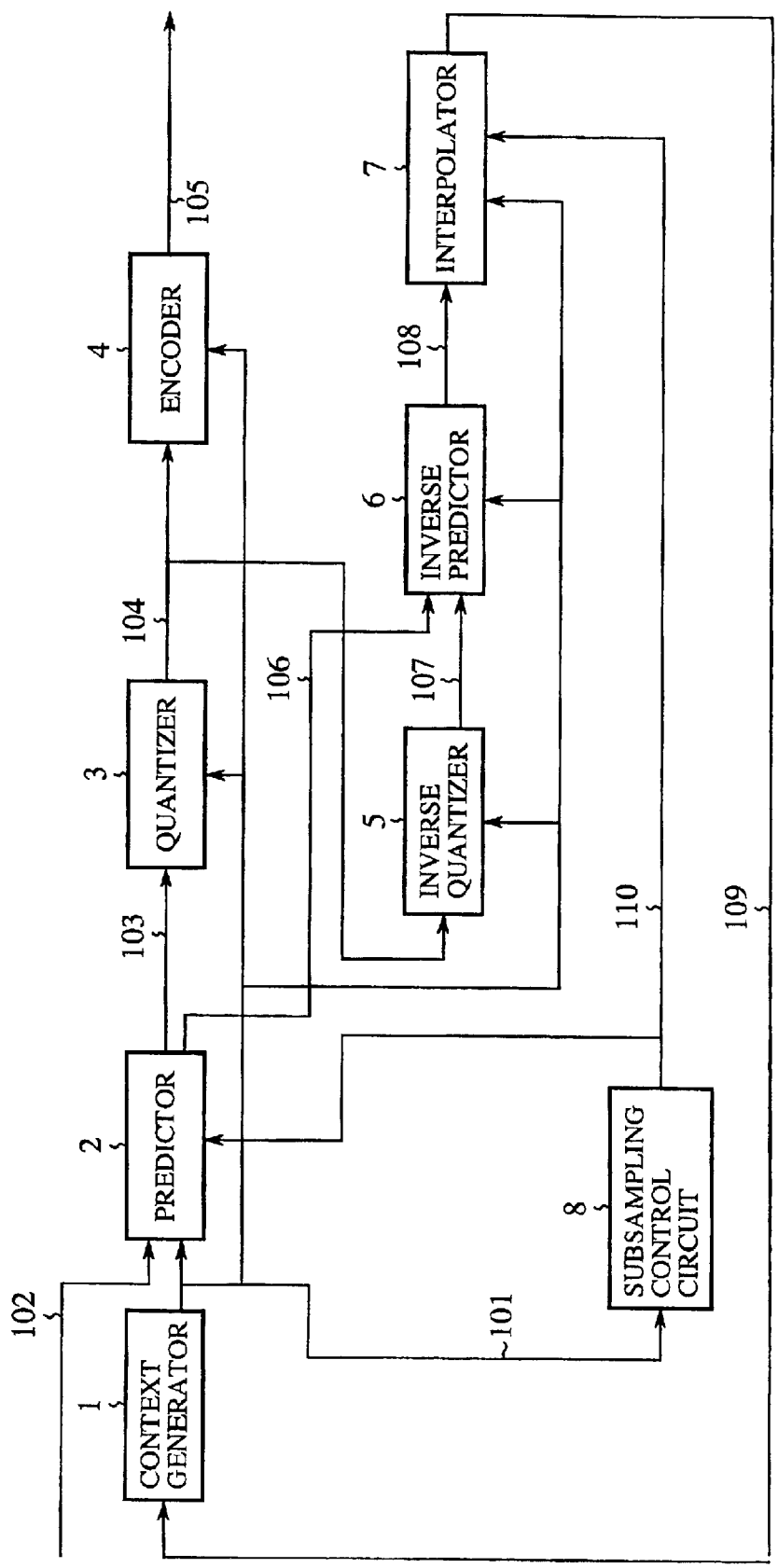
FIG. 1 shows a construction of an image signal coding apparatus according to a first embodiment of the present invention.

FIG. 1 shows a construction of an image signal coding apparatus according to a first embodiment of the present invention. Referring to FIG. 1, a context generator 1 generates a context signal 101 identifying a statistical difference of a target pixel 102 (symbol) to be coded from a preceding coded pixel (more strictly, a pixel value indicated by a reconstructed symbol 109 output from an interpolator 7 described later). A predictor 2 performs subsampling in accordance with a subsampling control signal 110 from a subsampling control circuit 8 described later and predicts a coded pixel based on the context signal 101 so as to generate a prediction signal 106 and a prediction error signal 103. A quantizer 3 quantizes the prediction error signal 103 so as to generate a quantized prediction error signal 104. An encoder 4 subjects the quantization prediction error signal 104 to entropy coding. An inverse quantizer 5 subjects the quantized prediction error signal 104 to inverse quantization so as to produce a reconstructed prediction error signal 107.

An inverse predictor 6 subjects the reconstructed prediction error signal 107 to inverse prediction so as to generate a reconstructed sampled signal 108 for the coded pixel. An interpolator 7 performs interpolation in accordance with the subsampling control signal 110, when the target pixel is subject to subsampling. A subsampling control circuit 8 determines whether the target pixel for coding should be subject to subsampling or should be coded using original data.

A description will now be given of the operation according to the first embodiment. FIG. 9 is a schematic diagram showing a target pixel x to be coded, reference pixels a–c and a subsequent pixel y. In the description that follows, a pixel value is indicated by a symbol representing the pixel. For example, a pixel value of a pixel a is indicated by a.

Context generation, prediction, quantization and coding according to the first embodiment proceeds in a similar manner as the encoding (without bias cancellation function) of a natural picture mode defined in the JPEG-LS coding described in "Multi-value Lossless Coding Technology and International Standard", Journal of The Institute of Image Electronics Engineers of Japan (Vol. 27 No. 4 405:412).

That is, the context generator 1 refers to four pixels i, j, k and o shown in FIG. 9 so as to determine differences D1=k−j, D2=j−i and D3=i−o between two adjacent pixels. Using a plurality of predefined threshold levels (hereinafter, referred to as context generating threshold levels), the context generator 1 quantizes each of D1, D2 and D3 to fit to one of nine patterns in order to produce Q1, Q2 and Q3 and outputs Q1, Q2 and Q3 in a context signal 101. Context patters of opposite polarities are dealt with as one pattern.

The predictor 2 uses the following expressions to determine a prediction value P (prediction signal 106) of the target pixel x for coding, based on the reference pixels i, j, k, o.

$P = \min(o,j)$ (if $i \geq \max(o, j)$)

$= \max(o,j)$ (if $i \leq \max(o, j)$)

$= o+j-i$ (otherwise)

The predictor 2 determines a difference between the actual value of the target pixel x (symbol 102 subject to coding) for coding and the prediction value P (prediction signal 106). The predictor 2 generates a prediction error e (prediction error signal 103) indicating the difference.

The quantizer 3 quantizes a prediction error e represented by the prediction error signal 103 so as to generate a quantized prediction error signal 104.

The encoder 4 transforms the prediction error e represented by the quantized prediction error signal 104 into a prediction rank M(e) of a non-negative integer, in accordance with the following expression, the prediction rank indicating the rank of the prediction error in a hierarchy of the frequency of occurrence of prediction errors. A order (parameter k) of Golomb coding is made to vary depending on the concentration of distribution of the prediction errors, so as to generate prediction error coded data 105.

$M(e) = 2 \times e$ (if $e>0$)

$= (-2) \times e - 1$ (else)

For each context Q, an accumulated total A[Q} of absolute values of prediction errors e and a frequency of occurrence N[Q] of the context Q are stored so that the order (parameter k) of Golomb coding is selected such that the following expression is satisfied.

$2^{k-1} < A[Q]/N[Q] \leq 2^k$

These procedures are the same as those in the natural picture mode of the JPEG-LS coding.

The subsampling control circuit 8 calculates six absolute values ($\nabla 1 - \nabla 6$) of second-derivatives, for the target pixel x. Each of the absolute values is compared with a threshold level TH (hereinafter, referred to as subsampling threshold level TH).

$\nabla 1 = |a - 2 \times g + m|$ $\nabla 2 = |b - 2 \times h + n|$ $\nabla 3 = |c - 2 \times i + o|$ $\nabla 4 = |h - 2 \times i + j|$ $\nabla 5 = |j - 2 \times k + l|$ $\nabla 6 = |m - 2 \times n + o|$ where a, b, c, g, h, l, m and n indicate pixel values of the reference pixels around the target pixel x shown in FIG. 9. The pixel values of the reference pixels are stored in the context generator 1 as the reconstructed symbols 109 reconstructed by the interpolator 7. The context generator 1 also stores reconstructed symbols indicating pixels values of pixels located on a line preceding the line on which the target pixel x is located and also pixel values of pixels located on a line that precedes the preceding line. Accordingly, the context signal 101 contains reconstructed symbols indicating pixel values of the pixels a–m. The symbols contained in the context signal 101 are not symbols themselves of the respective locations but those generated as a result of inverse quantization, inverse prediction and interpolation, so that errors may be contained therein.

If any one of the second-derivatives exceeds the subsampling threshold level TH, the target pixel x is coded in a regular manner. In contrast, if all of the second-derivatives are below the subsampling threshold level TH, it is determined that the target pixel x should be subject to a subsampling process. More specifically, the pixel x and the subsequent pixel y shown in FIG. 9 are coded together.

The subsampling control circuit 8 determines whether the target pixel x should be coded in a regular manner or should be subject to subsampling together with the subsequent pixel y. The subsampling control circuit 8 outputs the subsampling control signal 110 indicating the result of determination.

If the subsampling control signal 110 output from the subsampling control circuit 8 indicates that the target pixel x should be regularly coded, the predictor 2 generates the prediction signal 106 and the prediction error signal 103 for the pixel x. If the pixel x should be subject to subsampling, the predictor 2 does not generate the prediction signal 106 and the prediction error signal 103.

If the pixel x should be subject to subsampling so that the prediction signal 106 and the prediction error signal 103 for the pixel x are not output from the predictor 2, the quantizer 3 and encoder 4 do not perform the aforementioned processes to code the pixel x but waits an input of the symbol 102 indicating the pixel value of the subsequent pixel y to the predictor 2.

The predictor 2, receiving an input of the symbol 102 indicating the pixel value of the subsequent pixel y, uses the prediction value P for the preceding pixel x as the prediction value for the pixel value of the pixel y. The predictor 2 generates a prediction signal 106 and the prediction error signal 103 for an average of the pixel x and the pixel y.

The encoder 4 performs the aforementioned coding process on the quantized prediction error signal 104 generated by the quantizer 3 as a result of quantizing the prediction error signal 103 for the average. The order (parameter k) of Golomb coding used in this case is determined from a context different from that of a case where the pixel x is not subject to subsampling. More specifically, the accumulated total A[Q] of absolute values of prediction errors for a case where the pixel x is not subject to subsampling is made to differ from that of a case where the pixel x is subject to subsampling.

In other words, the encoder 4 uses different contexts for a case where subsampling is performed and for a case where subsampling is not performed.

Reference pixel signals used for generation of the context signal 101 are pixel signals (reconstructed symbols) 109 reconstructed from coded pixels subject to inverse prediction and interpolation described later. Therefore, the subsampling control signal 110 indicating whether or not subsampling should be performed need not be coded.

The inverse quantizer 5 inverts the quantized prediction error signal 104 into a value representing the quantization level, so as to generate a reconstructed prediction error signal 107. The reconstructed prediction error signal 107 thus generated is subtracted in the inverse predictor 6 from the prediction value P indicating the prediction signal 106 so as to produce the reconstructed sampled signal 108.

If the pixel x is not subject to subsampling, the interpolator 7 outputs the reconstructed sampled signal 108 as the reconstructed coded symbol 109. If the pixel x is subject to subsampling, the interpolator 7 outputs the reconstructed sampled signal 108 twice as the respective reconstructed coded symbols 109. The reconstructed coded symbols 109 are delivered to the context generator 1 and used as reference pixel signals in coding the image.

With this, coding that employs subsampling adapted for localized behavior of an image signal is enabled.

As described above, a predictive coding using coded reference pixels is configured to ensure adaptive switching between regular coding and subsampling using second-derivative signals obtained from reference pixel signals. Accordingly, the need for switching between extrapolation and interpolation is eliminated, the apparatus size is reduced, and the need for coding subsampling information is eliminated, resulting in efficient coding.

The first embodiment is described as using Golomb coding in an encoder. Alternatively, MELCODE, described in the aforementioned Journal may be used. A memory that should be provided for each context for determination of a order of Golomb coding may be implemented by status identification register for identifying a current status and an MPS counter for storing the number of prioritized symbol MPS's occurring in the status.

Similarly, arithmetic coding such as QM-coder, MQ-coder, arithmetic MELCODE and the like may be used. Arithmetic coding also requires the use of a status identification register and an MPS counter for each context. A benefit of arithmetic coding is efficient coding.

The first embodiment is configured to use different coding orders (parameters) for a case where subsampling is performed and for a case where regular coding is performed. For simplicity of the apparatus, only one coding parameter may be used irrespective of whether subsampling is performed or not.

While a plurality of second-derivatives in the horizontal direction and in the vertical direction are used for subsampling control in the first embodiment, the following absolute values of Laplacians may be used.

$$\nabla 1 = |b+g+n+i-4 \times h|$$

$$\nabla 2 = |c+h+o+j-4 \times i|$$

As described, a coding apparatus according to the first embodiment comprises: a context generator 1 generating a context signal 101 from a reconstructed symbol 109; a predictor 2 generating a prediction signal 106 indicating a prediction value which is a prediction of a symbol 102 to be coded, based on the context signal 101, and a prediction error signal 103 which is a difference between the prediction value and the symbol 102; a quantizer 3 generating a quantized prediction error signal 104 by quantizing the prediction error signal 103; an encoder 4 coding the quantized prediction error signal 104 by referring to the context signal 101; an inverse quantizer 5 subjecting the quantized prediction error signal 104 to inverse quantization so as to generate a reconstructed prediction error signal 107; an inverse predictor 6 subjecting the reconstructed prediction error signal 107 to inverse prediction so as to generate a reconstructed sampled signal 108; a subsampling control circuit 8 generating a subsampling control signal 110 indicating whether or not the symbol 102 should be subject to subsampling; and an interpolator 7 referring to the subsampling control signal 110 so as to subject to interpolation the reconstructed sampled signal 108 corresponding to the symbol 102 subject to subsampling, wherein the coding apparatus codes symbols while adaptively employing subsampling.

The coding apparatus of the first embodiment may determine whether the symbol to be coded should be subject to subsampling, by allowing the subsampling control circuit 8 to refer to the reconstructed symbol generated in the interpolator 7.

The encoder 4 may use the systematic Huffman code and be provided with a memory storing, for each context, information for determination of a type of coding used (order).

The encoder 4 may alternatively use arithmetic coding and be provided with a memory storing, for each context, information for determination of a type of coding used (span on a number line assigned to a symbol).

For each context, the encoder 4 may use different memories depending on whether or not the symbol to be coded is subject to subsampling.

The subsampling control circuit 8 may refer to second-derivatives of a plurality of symbols so as to determine whether or not the symbol to be coded should be subject to subsampling.

The subsampling control circuit 8 may refer to Laplacians so as to determine whether the symbol to be coded should be subject to subsampling.

The invention according to the first embodiment may also be implemented as a coding method comprising steps executed in respective components of the coding apparatus as described above.

A coding method according to the first embodiment comprises: a context generating step for generating a context signal 101 from a reconstructed symbol 109; a prediction step for generating a prediction signal 106 which is a prediction of a symbol to be coded, based on the context signal 101, and a prediction error signal 103 which is a difference between the prediction value and the symbol to be coded; a quantizing step for quantizing the prediction error signal 103 so as to generate a quantized prediction error signal 104; a coding step for coding the quantized prediction error signal 104 by referring to the context signal 101; an inverse quantization step for subjecting the quantized prediction error signal 104 to inverse quantization so as to generate a reconstructed prediction error signal 107; an inverse prediction step for subjecting the reconstructed prediction error signal 107 to inverse prediction so as to generate the reconstructed sampled signal 108; a subsampling control step for generating a subsampling control signal 110 for determining whether the symbol 102 should be subject to subsampling; and an interpolation step for subjecting to interpolation the reconstructed sampled signal 108 corresponding to the symbol 102 subject to subsampling, wherein the coding method codes samples while adaptively employing subsampling.

The subsampling control step of the above-described method may refer to the reconstructed symbol generated in the process of interpolation so as to determine whether the symbol to be coded should be subject to subsampling.

The coding step according to the method of the first embodiment may use the systematic Huffman code and store, for each context, information for determination of a type of coding (order) to be used.

The coding step according to the method of the first embodiment may use arithmetic coding and store, for each context, information for determination of a type of coding (span on a number line assigned to a symbol).

For each context, the coding step according to the method of the first embodiment may use different memories depending on whether or not the symbol to be coded is subject to subsampling.

The subsampling control step according to the method of the first embodiment may refer to second-derivatives of a plurality of symbols so as to determine whether or not the symbol to be coded should be subject to subsampling.

The subsampling control step according to the method of the first embodiment may refer to Laplacians so as to determine whether the symbol to be coded should be subject to subsampling.

As described above, in predictive coding using coded reference pixels according to the first embodiment, second-derivative signals determined from the reference pixel signals are used for adaptive switching between subsampling and regular coding of the target pixel. Accordingly, the need to switch between extrapolation prediction and interpolation prediction is eliminated. With this, the size of the apparatus is reduced. Since it is not necessary to code subsampling information, efficient coding is enabled.

Second Embodiment

In the first embodiment, a single predetermined subsampling method is used. In the second embodiment, the subsampling method is controlled while an image is being processed for the purpose of producing a uniform code size.

Figure 2:
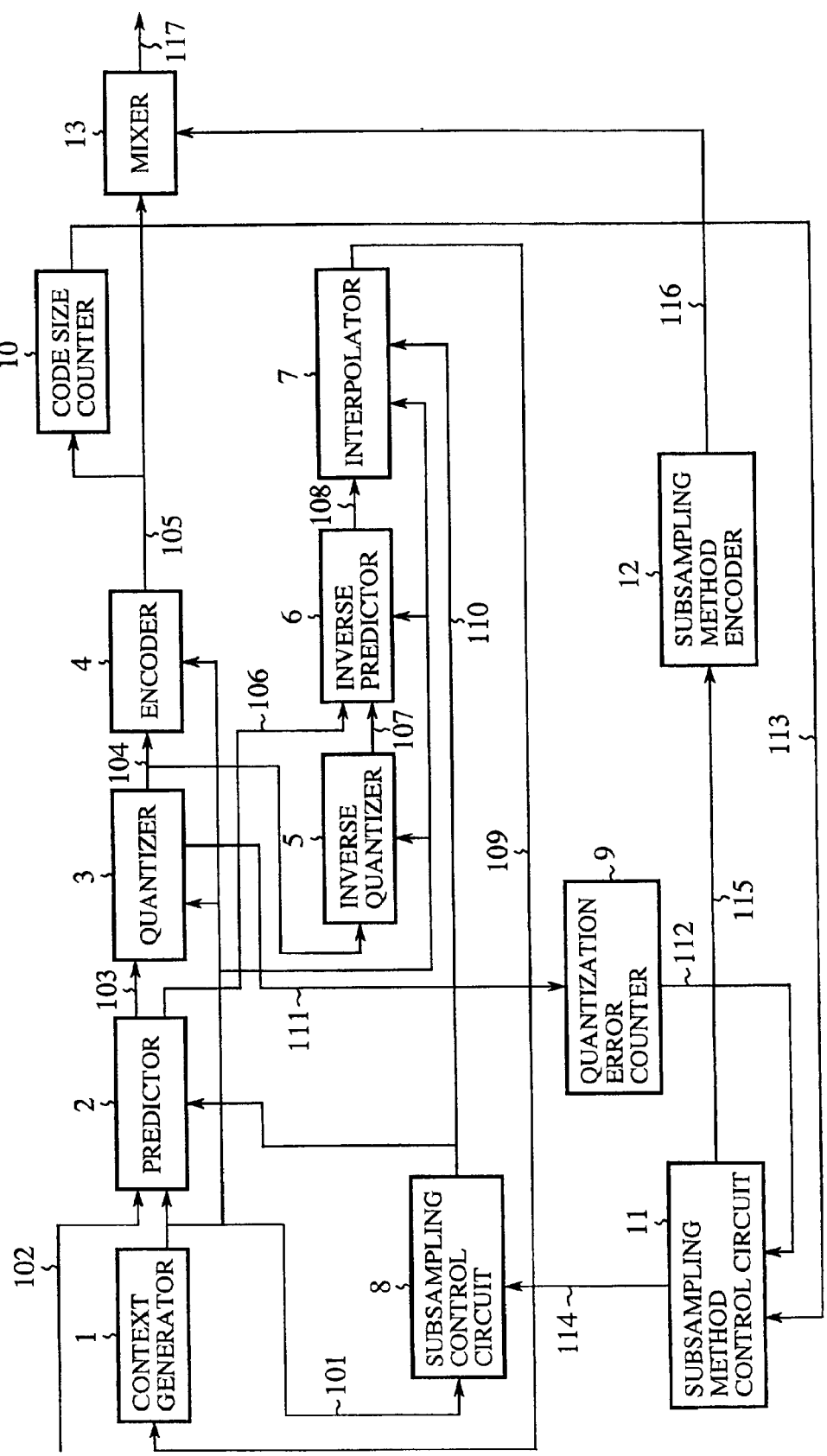
FIG. 2 shows a construction of an image signal coding apparatus according to a second embodiment of the present invention.

FIG. 2 shows a construction of an image signal coding apparatus according to a second embodiment of the present invention. Referring to FIG. 2, a quantization error counter 9 counts, for a stripe comprising a plurality of lines, the value indicated by a quantization error signal 111 generated by the quantizer 3 as a result of quantizing the prediction error signal 103, so as to generate a quantization error count 112. A code size counter 10 counts the value indicated by the prediction error coded data 105 in a stripe, so as to generate a code size count 113.

A subsampling method control circuit 11 uses the quantization error count 112 and the code size count 113 to generate a subsampling method parameter 114 and a subsampling method identification signal 115. The subsampling method parameter 114 is used to control a subsampling method for a subsequent stripe. The subsampling method identification signal 115 is used to identify a subsampling method before generating the prediction error coded data 105 for the current stripe. A subsampling method encoder 12 codes the subsampling method identification signal 115 so as to generate subsampling method coded data 116. A mixer 16 multiplexes the prediction error coded data 105 and the subsampling method coded data 116 so as to produce mixed coded data 117.

Those components designated by the same reference numerals as the components of FIG. 1 are the same as the corresponding components. An exception is that, while the quantizer 3 according to the first embodiment quantizes the prediction error signal 103 so as to generate the quantized prediction error signal 104, the quantizer 3 according to the second embodiment not only generate the quantized prediction error signal 104 but also the quantization error signal 111. The quantization error signal 111 indicates an error occurring as a result of quantization and is given by quantization error signal 111=prediction error signal 103−reconstructed prediction error signal 107

In the second embodiment, the size of code generated and the quantization error in a subsequent stripe are estimated from the size of code generated and the quantization error in a current stripe so that the subsampling method is controlled to achieve a desired bit rate and an S/N ratio. A stripe refers to a plurality of lines aggregated.

A description will now be given of the operation according to the second embodiment. Referring to FIG. 2, the quantization error counter 9 counts the value indicated by the quantization error signal 111 from the quantizer 3 for a stripe comprising a plurality of lines, so as to generate the quantization error count 112. The code size counter 10 counts the value indicated by the prediction error coded data 105 from the encoder 4 for a stripe, so as to generate code size count 113.

The subsampling method control circuit 11 uses the quantization error count 112 generated by the quantization error counter 9 and the code size count 113 generated by the code size counter 10, so as to generate the subsampling parameter 114 and the subsampling method identification signal 115. The subsampling method parameter 114 is used to control a subsampling method for a stripe. The subsampling method identification signal 115 identifies a subsampling method before generating the prediction error coded data 105 for a preceding stripe.

The subsampling method encoder 12 codes the subsampling method identification signal 115 generated by the subsampling method control circuit 11, so as to generate the subsampling method coded data 116.

The mixer 13 multiplexes the prediction error coded data 105 and the subsampling method coded data 116 so as to generate the mixed coded data 117.

If an accumulative code size indicated by the code size count 113 for a current stripe output from the code size counter 10 is larger than a target bit rate, the subsampling threshold level TH for the second-derivatives shown in the first embodiment is raised. If the contrary is the case, the threshold level TH is lowered. If a sum of absolute values of the quantization errors indicated by the quantization error count 112 is larger than a target level, the level of TH is lowered. If the contrary is the case, the level of TH is raised. If the above-mentioned control modes operate in opposite directions, the priority is given to the control based on code size indicated by the code size count 113.

The subsampling method control circuit 11 thus controls the subsampling threshold level TH and outputs the subsampling method parameter 114 indicating the subsampling threshold level TH determined as a result of the control.

The subsampling control circuit 8 uses the subsampling threshold level TH indicated by the subsampling method parameter 114 output from the subsampling method control circuit 11 to effect subsampling control process as described in the first embodiment.

The subsampling method encoder 12 generates a signal containing a predefined marker code, followed by a binary representation of the subsampling threshold level TH, based on the subsampling method identification signal 115 output from the subsampling method control circuit 11. The subsampling method encoder 12 outputs the signal as the subsampling method coded data 116.

The mixer 13 mixes the prediction error coded data 105 output from the encoder 4 and the subsampling method coded data 116 output from the subsampling method encoder 12 so as to generate the mixed coded data 117.

With this, efficient image coding is enabled in a system in which a uniform code size is particularly sought. For example, the second embodiment finds an application in an encoder LSI for a digital camera or a portable telephone set in which only a limited coded data memory is available.

As described, in addition to the components of the coding apparatus according to the first embodiment, the coding apparatus according to the second embodiment further comprises one or both of a code size counter 10 and a quantized error counter 9, the code size counter 10 generating a code size count 113 by counting the value indicated by prediction error coded data 105, and the quantization error signal counter 9 counting the value indicated by a quantization error signal 111 so as to generate a quantization error count 112, the apparatus further comprising: a subsampling method control circuit 11 referring to one or both of the code size count 113 and the quantization error count 112, so as to generate a subsampling method parameter 114 and a subsampling method identification signal 115, the subsampling method parameter 114 being provided for selection of a subsampling method, and the subsampling method identification signal 115 identifying one of a plurality of methods of subsampling control provided in a subsampling control circuit 8; and a subsampling method encoder 12 coding the subsampling method identification signal 115 so as to generate subsampling method coded data 116.

The invention according to the second embodiment may also be implemented as a coding method comprising the steps executed by the respective components of the coding apparatus.

In addition to the steps of the first embodiment, a coding method according to the second embodiment comprises: one of two steps including a code size counting step and a quantization error counting step, the code size counting step counting the value indicated by the prediction error coded data 105 so as to generate the code size count 113, and the quantization error counting step counting the value indicated by the quantization error signal 111 so as to generate the quantization error count 112, the method further comprising: a subsampling method control step for referring to one or both of the code size count 113 and the quantization error count 112, so as to generate the subsampling method parameter 114 and the subsampling method identification signal 115, the subsampling method parameter 114 being provided for selection of a subsampling method, and the subsampling method identification signal 115 identifying one of a plurality of methods of subsampling control provided in a subsampling control circuit 8; and a subsampling method coding step for coding the subsampling method identification signal 115 so as to generate subsampling method coded data 116.

In the second embodiment, the size of code generated and the quantization error in a stripe are estimated from the size of code generated and the quantization error in a preceding stripe so that the subsampling method is controlled to achieve a desired bit rate and an S/N ratio. With this, efficient image coding is enabled in a system in which a uniform code size is particularly sought. For example, the second embodiment finds an application in an encoder LSI for a digital camera or a portable telephone set in which only a limited coded data memory is available.

Third Embodiment

In the first and second embodiments described above, the subsampling method is controlled based on the coded pixel information. In the third embodiment, a tighter control is effected using the code size and the S/N ratio. According to the third embodiment, a screen of data is stored in a memory prior to coding.

Figure 3:
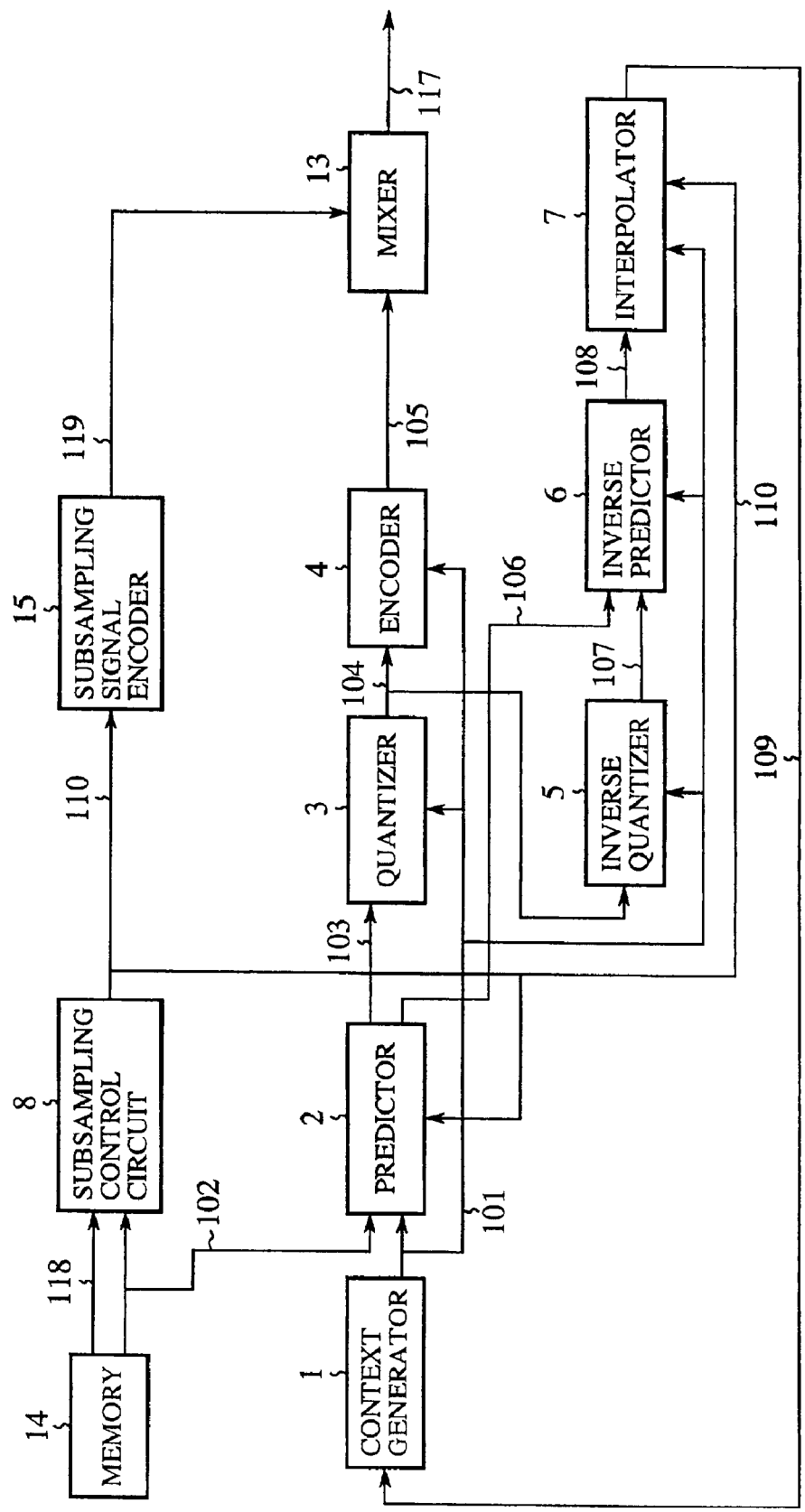
FIG. 3 shows a construction of an image signal coding apparatus according to a third embodiment of the present invention.

FIG. 3 shows a construction of an image signal coding apparatus according to the third embodiment of the present invention. Referring to FIG. 3, a memory 14 stores data indicating pixel values of pixels constituting a screen prior to coding. A subsampling control signal encoder 15 codes a subsampling control signal coded data 119. Those components designated by the same reference numerals as the components of the first and second embodiments shown in FIGS. 1 and 2 are the same as the corresponding components.

A description will now be given of the operation according to the third embodiment. The memory 14 stores data indicating pixel values of pixels for a screen prior to coding. The memory 14 thus outputs the symbol 102 indicating the pixel value of the pixel x to be coded, and a neighborhood symbol 118 indicating the pixel value of a pixel adjacent to the pixel x.

The subsampling control circuit 8 receives the input of the neighborhood symbol 118 indicating the pixel value of the pixel already coded, the symbol 102 to be coded indicating the pixel value of the pixel x to be coded, and the neighborhood symbol 118 indicating the pixel value of the pixel to be coded subsequent to the pixel x.

Thus, the pixel value of the pixel (for example, the pixel y shown in FIG. 9) to be coded subsequent to the pixel x is supplied from the memory 14 to the subsampling control circuit 8. Thus, in addition to the threshold level TH and the six second-derivatives ($\nabla 1$–$\nabla 6$) used in the first embodiment, the subsampling control circuit 8 also uses the pixel value of the subsequent pixel y as a basis for determination as to whether or not the pixel x should be coded regular or subject to subsampling.

With this configuration, the pixel x may be regularly coded instead of being subject to subsampling when the pixel value of the pixel y significantly differs from that of the pixel x. Accordingly, a tighter subsampling method control is effected.

The subsampling control signal encoder 15 codes the subsampling control signal 110 output from the subsampling control circuit 8 prior to the output of the prediction error coded data 105 for the pixel x, so as to generate the subsampling control signal coded data.

Since, according to the above-described arrangement, not only the pixel value of the pixel to be coded indicated by the symbol 102 but also the pixel value of the subsequently coded pixel is used, it is necessary to attach information to each pixel indicating whether or not the pixel is subject to subsampling. The method for coding the subsampling method may be implemented by a coding method for a binary image, whereby "0" is used to indicate the non-use of subsampling and "1" is used to indicate the use of subsampling.

The mixer 13 mixes the prediction error coded data 105 output from the encoder 4 and the subsampling control signal coded data 119 output from the subsampling control signal encoder 15, so as to generate the mixed coded data 117.

As described, in addition to the components of the coding apparatus according to the first embodiment, the coding apparatus according to the third embodiment further comprises: a subsampling control signal encoder 15 for coding the subsampling control signal 110 so as to generate the subsampling control signal coded data 119. The subsampling control circuit 8 determines whether the symbol 102 should be coded, based on information, including the symbol 102, stored in the memory 14 (information source symbols).

The invention according to the third embodiment may also be implemented as a coding method comprising the steps executed by respective components of the coding apparatus.

In addition to the steps of the first embodiment, a coding method according to the third embodiment further comprises: a subsampling control signal coding step for coding the subsampling control signal 110 so as to generate the subsampling control signal coded data 119. In the subsampling control step, a determination is made as to whether the symbol 102 should be coded, based on the information source symbols 14 including the symbol 102.

Thus, according to the third embodiment, the pixel value of the pixel y to be coded subsequent to the target pixel x for coding is additionally referred to for determination as to whether the pixel x should be regularly coded or subject to subsampling. Accordingly, it is ensured that the pixel x is coded without being subject to subsampling when the pixel value of the subsequent pixel y significantly differs from the pixel value of the target pixel x, resulting in a tighter subsampling control.

Fourth Embodiment

The image coding apparatus according to the fourth embodiment codes a luminance signal Y and color-difference signals Cr/Cb independently.

Figure 4:
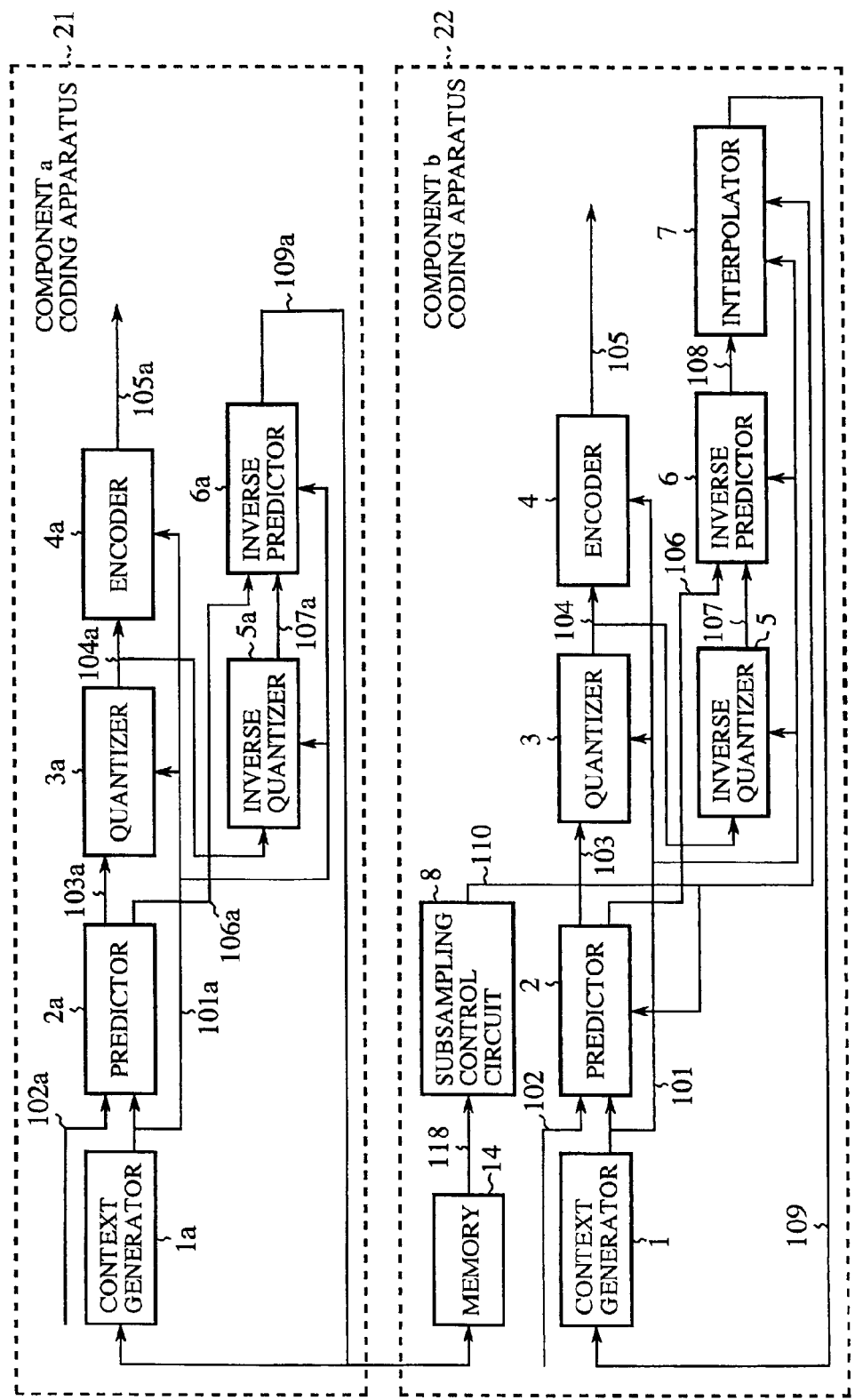
FIG. 4 shows a construction of an image signal coding apparatus according to a fourth embodiment of the present invention.

FIG. 4 shows a construction of an image signal coding apparatus according to a fourth embodiment of the present invention. Referring to FIG. 4, a section in which suffixes a are used for reference indicates a coding apparatus for the luminance signal Y (component a) and a section without suffixes indicates a coding apparatus for the color difference signals Cr/Cb. Those components designated by the same reference numerals as the components of FIGS. 1 through 3 or those components designated by similar reference numerals are the same as the corresponding components of the first through third embodiments.

The coding apparatus for component a is configured such that those components of the coding apparatus of the first embodiment related to subsampling, i.e. the interpolator 7 and the subsampling control circuit 8, are eliminated.

In the coding apparatus for component b (Cr/Cb), the memory 14 stores a reconstructed luminance signal 109a, and the subsampling control circuit 8 determines whether the color difference signals for a target pixel should be subject to subsampling based on the luminance signal 118. The other components are the same as the corresponding components of the first embodiment.

A description will now be given of the operation according to the fourth embodiment. In the fourth embodiment, the luminance signal Y is not subject to subsampling. Whether the color difference signals Cr/Cb should be subject to subsampling is determined using the corresponding luminance signal Y (Y signal of a target pixel to be coded or an adjacent reference pixel). The reason why the use or non-use of subsampling of the color difference signals Cr/Cb is determined using the luminance signal Y is that, in the case of color images, a fairly accurate determination is possible by using luminance signals Y of a reference pixel and a target pixel, including the luminance signal Y of the subsequent pixel. The decoding end, recovering the Y signals of the target pixel and the neighborhood pixel, is capable of determining whether the target pixel is subjected to subsampling merely by referring to the luminance signal recovered. Accordingly, the encoding end need not code a signal indicating the use or non-use of subsampling. Thereby, the efficiency of coding is improved.

The memory 14 is provided with a delaying function in the direction of arrangement of pixels and/or in the direction of lines. The memory 14 outputs the luminance signals Y of a reference pixel, a target pixel and a subsequent pixel as the neighborhood symbol 118.

The subsampling control circuit 8 determines whether to subject the color difference signals Cr/Cb of the target pixel to subsampling or to regularly code them, based on the neighborhood symbol 118 from the memory 14. The subsampling control circuit 8 outputs a subsampling control signal 110 indicating the result of determination.

The operation of the context generator 1, the predictor 2, the quantizer 3, the encoder 4, the inverse quantizer 5, the inverse predictor 6 and the interpolator 7 is the same as that of the corresponding components of the third embodiment so that the description thereof is omitted.

In the coding apparatus according to the fourth embodiment for component b, the subsampling control signal encoder 15 and the mixer 13 used in the coding apparatus of the third embodiment are not used. The reason is that the decoding end is capable of determining whether the target pixel is subjected to subsampling by referring to the luminance signal Y recovered at the decoding end and that the coding end need not code a signal indicating whether the color difference signals Cr/Cb are subjected to subsampling.

The luminance signal Y is used to determine whether the color difference signals Cr/Cb of individual pixels should be subject to subsampling.

The visual perception of human beings is characterized by a less sensitivity for color difference signals Cr/Cb at a high frequency than for the luminance signal Y at the same frequency. The fourth embodiment enables reduction in code size by subsampling while preventing the quality of visual perception from being unfavorably affected.

In addition to the components of the coding apparatus of the first embodiment, the coding apparatus according to the fourth embodiment further comprises: a second context generator 1a generating a context signal 110a from a reconstructed symbol 108a; a second predictor 2a generating, based on the context signal 110a, a prediction signal 106a indicating a prediction value which is a prediction of a symbol 102a to be coded, and a prediction error signal 103a which is a difference between the prediction value and the symbol 102a; a second quantizer 3a quantizing the prediction error signal 103a so as to generate a quantized prediction error signal 104a; a second encoder 4a coding the quantized prediction error signal 104a by referring to the context signal 110a; a second inverse quantizer 5a subjecting the quantized prediction error signal 104a to inverse quantization so as to generate a reconstructed prediction error signal 107a; and a second inverse predictor 6a subjecting the reconstructed prediction error signal 107a to inverse prediction so as to generate a reconstructed symbol 109a. The second context generator 1a, the second predictor 2a, the second quantizer 3a, the second encoder 4a, the second inverse quantizer 5a and the second inverse predictor 6a constitute a coding unit 21 for component a. The context generator 1, the predictor 2, the quantizer 3, the encoder 4, the inverse quantizer 5, the inverse predictor 6, the interpolator 7 and the subsampling control circuit 8 constitute a coding section for component b. In the coding unit for component b, a determination is made as to whether the symbol 102a corresponding to the reconstructed symbol 109a should be subject to coding, using the reconstructed symbol 109a and adjacent symbols generated by the coding second for component a.

The invention according to the fourth embodiment may be implemented as a coding method comprising steps executed by the respective components of the coding apparatus.

In addition to the steps of the coding method according to the first embodiment, a coding method according to the fourth embodiment comprises: a second context generating step for generating a context signal 110a from a reconstructed symbol 109a; a second prediction step for generating a prediction value which is a prediction of a symbol 102a based on the context signal 110a, and a prediction error signal 103a which is a difference between the prediction value and the symbol 102a; a second quantizing step for quantizing the prediction error signal 103a so as to generate the quantized prediction error signal 104a; a second coding step for coding the quantized prediction error signal 104a by referring to the context signal 110a; a second inverse quantization step for subjecting the quantized prediction error signal 104a to inverse quantization so as to generate a reconstructed prediction error signal 107a; and a second inverse prediction step for subjecting the reconstructed prediction error signal 107a to inverse prediction so as to generate the reconstructed symbol 109a. The second context generating step, the second prediction step, the second quantizing step, the second coding step, the second inverse quantization step, the second inverse prediction step constitute the coding steps for component a. The context generating step, the prediction step, the quantization step, the coding step, the inverse quantization step, the inverse prediction step, the interpolation step and the subsampling control step constitute the coding steps for component b. In the coding steps for component b, a determination is made as to whether the symbol 102a corresponding to the reconstructed symbol 109a should be coded, using the reconstructed symbol 109a and adjacent symbols generated by the coding steps for component a.

Thus, according to the fourth embodiment, subsampling of the color difference signals Cr/Cb of a target pixel is controlled by using the luminance signal Y of the corresponding pixel, the luminance signal Y being coded without being subject to subsampling. Accordingly, the code size is successfully reduced while the quality of visual perception of the color difference signals Cr/Cb is prevented from being unfavorably affected, since the visual perception of human beings is characterized by a less sensitivity for the color difference signals Cr/Cb at a high frequency than for the luminance signal Y at the same frequency.

Fifth Embodiment

The fifth embodiment according to the invention provides a decoding apparatus corresponding to the coding apparatus according to the first embodiment.

Figure 5:
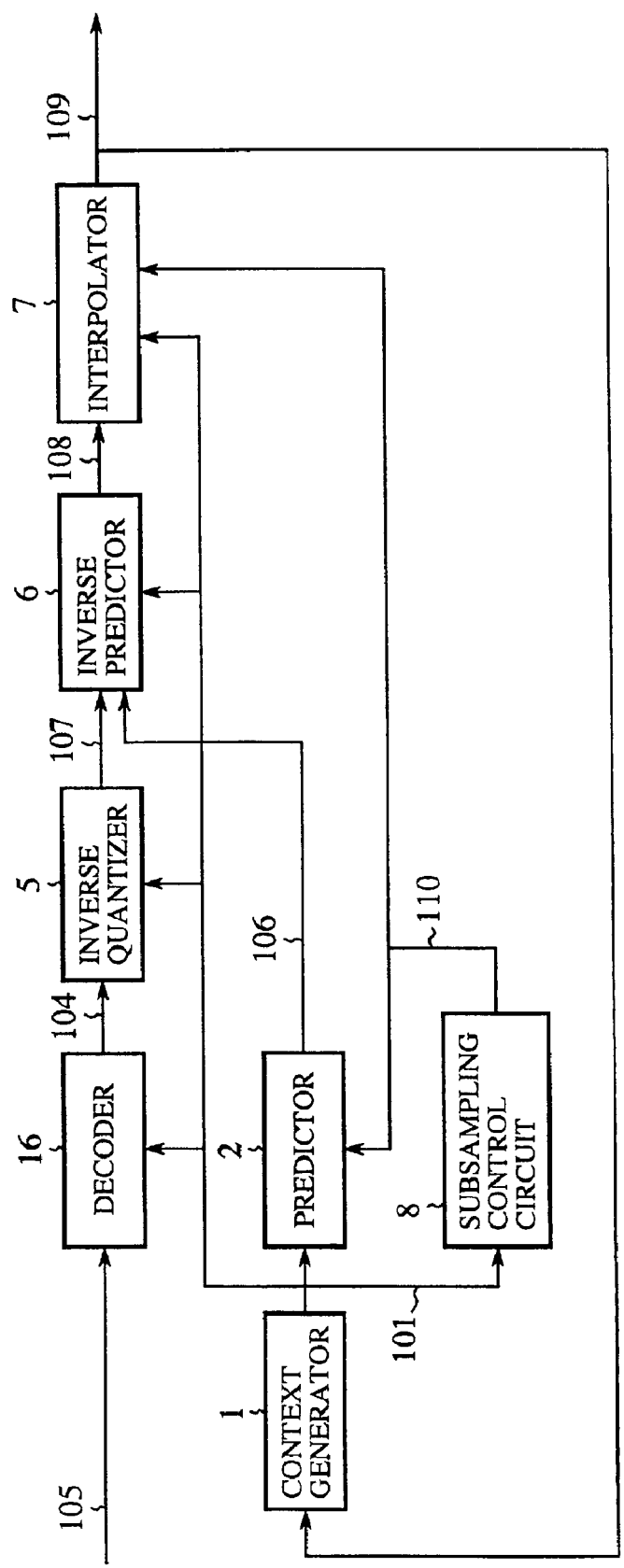
FIG. 5 shows a construction of an image signal coding apparatus according to a fifth embodiment of the present invention.

FIG. 5 shows a construction of an image signal decoding apparatus according to the fifth embodiment of the present invention. Referring to FIG. 5, the context generator 1 generates the context signal 101 identifying a statistical difference of the target pixel to be decoded, indicated by prediction error coded data 105, from preceding coded pixels (more strictly, the reconstructed symbol 109 output from the interpolator 7 described later).

The predictor 2 performs subsampling in accordance with a subsampling control signal 110 from the subsampling control circuit 8 described later and predicts a coded pixel based on the context signal 101 so as to generate the prediction signal 106.

A decoder 16 subjects the prediction error coded data 105 to entropy decoding so as to generate the quantized prediction error signal 104. The inverse quantizer 5 subjects the quantized prediction error signal 104 to inverse quantization so as to generate the reconstructed prediction error signal 107.

The inverse predictor 6 subjects the reconstructed prediction error signal 107 to inverse prediction so as to generate the reconstructed sampled signal 108. The interpolator 7 performs interpolation in accordance with the subsampling control signal 110, if the target pixel for decoding indicated by the prediction error coded data 105 is subjected to subsampling at the coding end. If the target pixel is not subjected to subsampling, the target pixel is reconstructed regularly.

The subsampling control circuit 8 determines whether the target pixel for decoding should be regularly reconstructed or the reconstructed symbol 109 should be generated by performing interpolation. The subsampling control circuit 8 outputs the subsampling control signal 110 indicating the result of determination.

A description will now be given of the operation according to the fifth embodiment.

That is, the context generator 1 refers to four pixels i, j, k and o shown in FIG. 9 so as to determine differences D1=k−j, D2=j−i and D3=i−o between two adjacent pixels.

Using a plurality of predefined threshold levels (hereinafter, referred to as context generating threshold levels), the context generator 1 quantizes each of D1, D2 and D3 to fit to one of nine patterns in order to produce Q1, Q2 and Q3 and outputs Q1, Q2 and Q3 in the context signal 101. Context patters of opposite polarities are dealt with as one pattern.

The predictor 2 uses the following expressions to determine a prediction value P (prediction signal 106) of the target pixel x for decoding, based on the reference pixels i, j, k, o.

$P = \min(o,j)$ (if $i \geq \max(o, j)$)

$= \max(o,j)$ (if $i \leq \max(o, j)$)

$= o+j-i$ (otherwise)

The decoder 16 decodes the prediction rank M(e) of a non-negative integer in accordance with the following expression, using the Golomb code with an order (parameter k) that satisfies the following expression.

$2^{k-1} < A/N \leq 2^k$ where A indicates the accumulated total of absolute values of the prediction errors and N indicates the frequency of occurrence the context, A and N being stored for each context.

The prediction error e (quantized prediction error signal 104) is generated as per $e = M(e)/2$ (if $M(e)$ is even)

$= (M(e)+1)/(-2)$ (if $M(e)$ is odd)

The inverse quantizer 5 inverts the quantized prediction error signal 104 into a value representing the quantization level, so as to generate the reconstructed prediction error signal 107. The reconstructed prediction error signal 107 thus generated is subtracted in the inverse predictor 6 from the prediction value P so as to produce the reconstructed sampled signal 108.

The subsampling control circuit 8 calculates six absolute values ($\nabla 1$–$\nabla 6$) of second-derivatives. Each of the absolute values is compared with a threshold level TH (hereinafter, referred to as subsampling threshold level TH).

$\nabla 1 = |a - 2 \times g + m|$ $\nabla 2 = |b - 2 \times h + n|$ $\nabla 3 = |c - 2 \times i + o|$ $\nabla 4 = |h - 2 \times i + j|$ $\nabla 5 = |j - 2 \times k + l|$ $\nabla 6 = |m - 2 \times n + o|$ If any one of the second-derivatives exceeds the subsampling threshold level TH, it is determined that the target pixel is regularly coded at the coding end. If all of the second-derivatives are below the subsampling threshold level TH, it is determined that the target pixel is subjected to subsampling.

The subsampling control circuit 8 outputs the subsampling control signal 110 for controlling a process related to subsampling, based on the subsampling threshold level TH and the second-derivatives ($\nabla 1$–$\nabla 6$).

If the subsampling control signal 110 indicates that the target pixel for decoding is regularly coded, the predictor 2 determines the prediction value P as described above so as to output the prediction error signal 106. If the target pixel is subjected to subsampling, the predictor 2 does not output the prediction signal 106.

If the subsampling control signal 110 indicates that the target pixel for decoding is regularly coded, the interpolator 7 outputs the reconstructed sampled signal 108 as the reconstructed symbol 109. If it is determined that the target pixel is subjected to subsampling, the interpolator 7 produces the reconstructed symbol 109 by outputting two reconstructed sampled signal 108 successively, the first output being for the target pixel and the second being for the subsequent pixel. The reconstructed symbol 109 is fed to the context generator 1 and used as the reference pixel signal for subsequent pixel decoding.

With this, decoding that employs subsampling adapted for localized behavior of an image signal is enabled.

As described above, when decoding codes produced by predictive coding whereby coded reference pixels are referred to, adaptive switching between regular decoding and successive output of two decoded signals is controlled using second-derivatives derived from reference pixel signals. Accordingly, the need for switching between extrapolation and interpolation is eliminated, the apparatus size is reduced, and the need for using coded subsampling information is eliminated, resulting in efficient decoding.

The fifth embodiment is described as being adapted for Golomb codes used in an encoder. Alternatively, MELCODE, described in the aforementioned Journal may be used. A memory that should be provided for each context for determination of a order of Golomb coding may be implemented by status identification register for identifying a current status and an MPS counter for storing the number of prioritized symbol MPS's occurring in the status.

Similarly, arithmetic coding such as QM-coder, MQ-coder, arithmetic MELCODE and the like may be used. Arithmetic coding also requires the use of a status identification register and an MPS counter for each context. A benefit of arithmetic coding is efficient coding.

The fifth embodiment is configured to use different coding orders (parameters) for a case where subsampling is identified and for a case where regular decoding is performed. For simplicity of the apparatus, only one coding order may be used irrespective of whether subsampling is identified or not.

While a plurality of second-derivatives in the horizontal direction and in the vertical direction are used for subsampling control in the fifth embodiment, the following absolute values of Laplacians may be used.

$$\nabla 1 = |b+g+n+i-4\times h|$$

$$\nabla 2 = |c+h+o+j-4\times i|$$

As described, a decoding apparatus according to the fifth embodiment comprises: a context generator 1 generating a context signal 101 from a reconstructed symbol 109; a predictor 2 generating a prediction signal 106 which is a prediction of a symbol 102 to be decoded, based on the context signal 101; a decoder 6 decoding prediction error coded data 105 by referring to the context signal 101 so as to generate a quantized prediction error signal 104; an inverse quantizer 5 subjecting the quantized prediction error signal 104 to inverse quantization so as to generate a reconstructed prediction error signal 107; an inverse predictor 6 subjecting the reconstructed prediction error signal 107 to inverse prediction so as to generate a reconstructed sampled signal 108; a subsampling control circuit 8 determining whether the prediction error coded data 105 is subjected to subsampling at a coding end, based on the context signal 101, and generating a subsampling control signal 110 indicating whether interpolation should be performed; and an interpolator 7 subjecting to interpolation the reconstructed sampled signal 108 corresponding to the prediction error coded data 105 determined to be subjected to subsampling at the coding end, by referring to the subsampling control signal 110, wherein the decoder performs decoding of the prediction error coded data adaptively subjected to subsampling at the coding end.

The subsampling control circuit 8 of the decoding apparatus according to the fifth embodiment may determine whether interpolation should be performed by referring to the reconstructed symbol 109 generated by the interpolator 7.

The decoder 16 of the decoding apparatus according to the fifth embodiment may decode using the systematic Huffman code and be provided with a memory storing, for each context, information for determination of a type of coding used (order).

The decoder 16 may alternatively use arithmetic coding and be provided with a memory storing, for each context, information for determination of a type of coding used (span on a number line assigned to a symbol).

For each context, the decoder 16 may use different memories depending on whether or not the symbol to be decoded is subjected to subsampling at the coding end.

The subsampling control circuit 8 may refer to second-derivatives of a plurality of symbols so as to determine whether or not the symbol to be decoded is subjected to subsampling at the coding end.

The subsampling control circuit 8 may refer to Laplacians so as to determine whether the symbol to be coded is subjected to subsampling at the coding end.

The invention according to the fifth embodiment may also be implemented by a decoding method comprising steps executed by the respective components of the decoding apparatus.

A decoding method according to the fifth embodiment comprises: a context generating step for generating a context signal 101 from a reconstructed symbol 109; a predicting step for generating a prediction signal 106 which is a prediction of a symbol 102 to be decoded, based on the context signal 101; a decoding step for decoding prediction error coded data 105 by referring to the context signal 101 so as to generate a quantized prediction error signal 104; an inverse quantization step for subjecting the quantized prediction error signal 104 to inverse quantization so as to generate a reconstructed prediction error signal 107; an inverse prediction step for subjecting the reconstructed prediction error signal 107 to inverse prediction so as to generate a reconstructed sampled signal 108; a subsampling control step for determining whether the prediction error coded data 105 is subjected to subsampling at a coding end, based on the context signal 101, and generating a subsampling control signal 110 indicating whether interpolation should be performed; and an interpolating step for reconstructing a signal determined to be subjected to subsampling at the coding end, by referring to the subsampling control signal 110, wherein the decoding method performs decoding of the prediction error coded data adaptively subjected to subsampling at the coding end.

The subsampling control step of the decoding method according to the fifth embodiment may determine whether interpolation should be performed by referring to the reconstructed symbol 109 generated in the interpolating step.

The decoding step of the decoding method according to the fifth embodiment may decode using the systematic Huffman code and store, for each context, information for determination of a type of coding used (order).

The decoding step may alternatively use arithmetic coding and store, for each context, information for determination of a type of coding used (span on a number line assigned to a symbol).

For each context, the decoding step may use different memories depending on whether or not the symbol to be decoded is subjected to subsampling at the coding end.

The subsampling control step may refer to second-derivatives of a plurality of symbols so as to determine whether or not the symbol to be decoded is subjected to subsampling at the coding end.

The subsampling control step may refer to Laplacians so as to determine whether the symbol to be coded is subjected to subsampling at the coding end.

As described, according to the fifth embodiment, when decoding codes produced by predictive coding whereby coded reference pixels are referred to, adaptive switching between regular decoding and successive output of two decoded signals is controlled using second-derivatives derived from reference pixel signals. Accordingly, the need for switching between extrapolation and interpolation is eliminated, the apparatus size is reduced, and the need for using coded subsampling information is eliminated, resulting in efficient decoding.

Sixth Embodiment

In the fifth embodiment, a single predetermined subsampling method is used. In the sixth embodiment, the subsampling method is controlled while an image is being processed for the purpose of producing a uniform code size. The image signal decoding apparatus according to the sixth embodiment is designed to decode mixed coded data output, for example, from the image signal coding apparatus according to the second embodiment.

Figure 6:
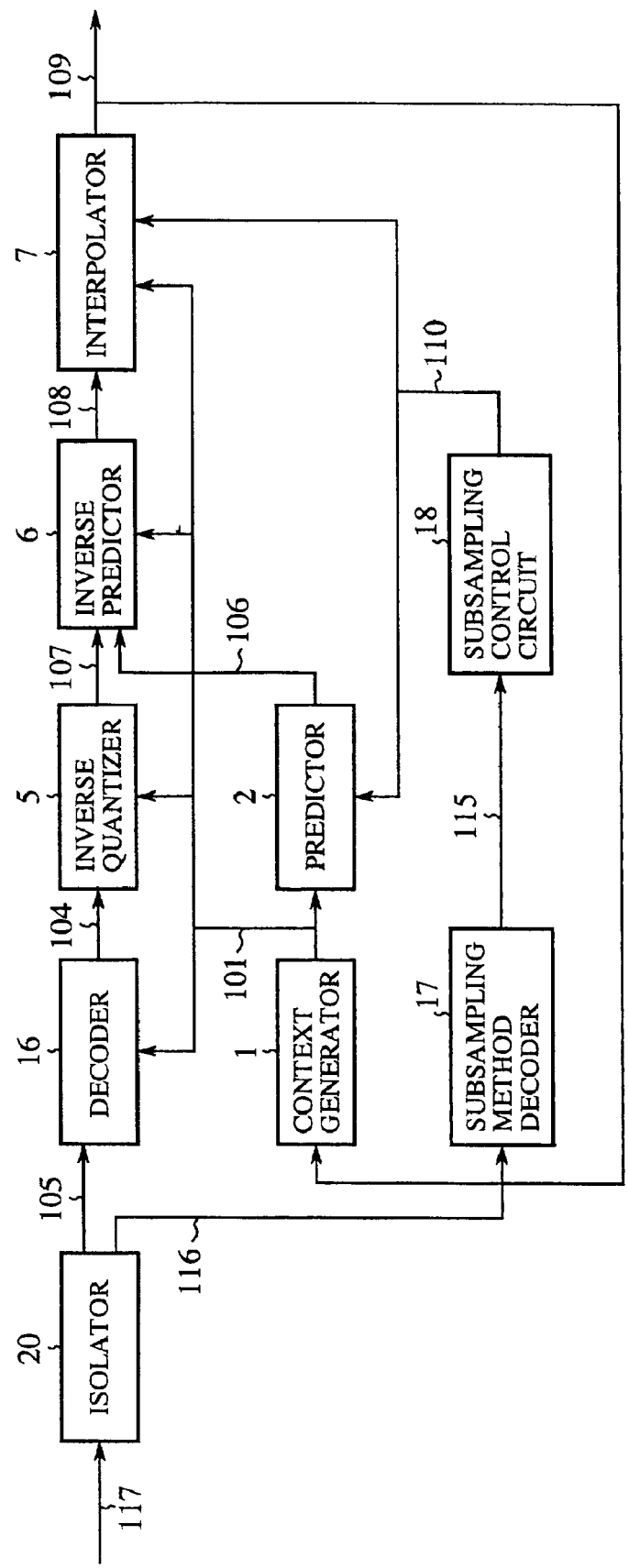
FIG. 6 shows a construction of an image signal coding apparatus according to a sixth embodiment of the present invention.

FIG. 6 shows a construction of an image signal decoding apparatus according to the sixth embodiment. Referring to FIG. 6, an isolator 20 isolates the subsampling method coded data 116 and the prediction error coded data 105 from the mixed coded data 117 derived from multiplexing. A sampling method decoder 17 decodes the subsampling method coded data 116 so as to generate the subsampling method identification signal 115. A subsampling method control circuit 18 uses the subsampling method identification signal 115 to control the subsampling method. The other components are the same as the corresponding components of the fifth embodiment.

A description will now be given of the operation according to the sixth embodiment. The isolator 20 isolates the subsampling method coded data 116 and the prediction error coded data 105 from the mixed coded data 117 output from, for example, the image signal coding apparatus according to the second embodiment.

The prediction error coded data 105 is supplied to the decoder 16. The subsampling method control circuit 18 outputs the subsampling control signal 110 based on the subsampling method identification signal 115 generated by the subsampling method decoder 17. The other aspects of the image signal decoding apparatus according to the sixth embodiment, including the generation of the reconstructed symbol 109, are the same as the corresponding aspects of the apparatus according to the fifth embodiment.

A description will now be given of the subsampling method decoder 17 and the subsampling method control circuit 18.

The subsampling method coded data 116 output from the isolator 20 is decoded by the subsampling method decoder 17 so as to produce the subsampling method identification signal 115. The subsampling method control circuit 18 determines whether the target pixel to be decoded is subjected to subsampling at the coding end, based on the subsampling method identification signal 115, and outputs the subsampling control signal 110 indicating the result of determination. The subsampling method control circuit 18 according to the sixth embodiment determines whether the target pixel is subjected to subsampling or regularly coded, based on the subsampling method identification signal 115, without calculating the absolute value of six second-derivatives and making a comparison with the subsampling threshold level TH as performed in the subsampling control circuit 8 of the fifth embodiment.

With this, efficient decoding of coded image data is enabled in a system in which a uniform code size is particularly sought. For example, the sixth embodiment finds an application in an encoder LSI for a digital camera or a portable telephone set in which only a limited coded data memory is available.

As described, in addition to the components of the decoding apparatus according to the fifth embodiment, the apparatus according to the sixth embodiment further comprises: a subsampling method decoder 17 decoding the subsampling method coded data 116 so as to generate the subsampling identification signal 115, wherein interpolation is performed by determining the subsampling method used at a coding end by referring to the subsampling identification signal 115.

The invention according to the sixth embodiment may also be implemented by a decoding method comprising the steps executed by the respective components of the decoding apparatus.

In addition to the steps of the decoding method according to the fifth embodiment, the decoding method according to the sixth embodiment further comprises: a subsampling method decoding step for decoding the subsampling method coded data 116 so as to generate the subsampling method identification signal 115, wherein interpolation is performed by determining the subsampling method used at a coding end by referring to the subsampling identification signal 115.

In the sixth embodiment, the size of code generated and the quantization error in a stripe are estimated from the size of code generated and the quantization error in a preceding stripe so that the subsampling method is controlled to achieve a desired bit rate and an S/N ratio. With this, efficient decoding of coded image data is enabled in a system in which a uniform code size is particularly sought. For example, the sixth embodiment finds an application in an encoder LSI for a digital camera or a portable telephone set in which only a limited coded data memory is available.

Seventh Embodiment

In the sixth embodiment described above, the subsampling method is controlled based on the previously coded pixel information. In the seventh embodiment, a tighter control is effected using the code size and the S/N ratio. The image signal decoding apparatus according to the seventh embodiment is designed to decode mixed coded data output from, for example, the image signal coding apparatus according to the third embodiment.

Figure 7:
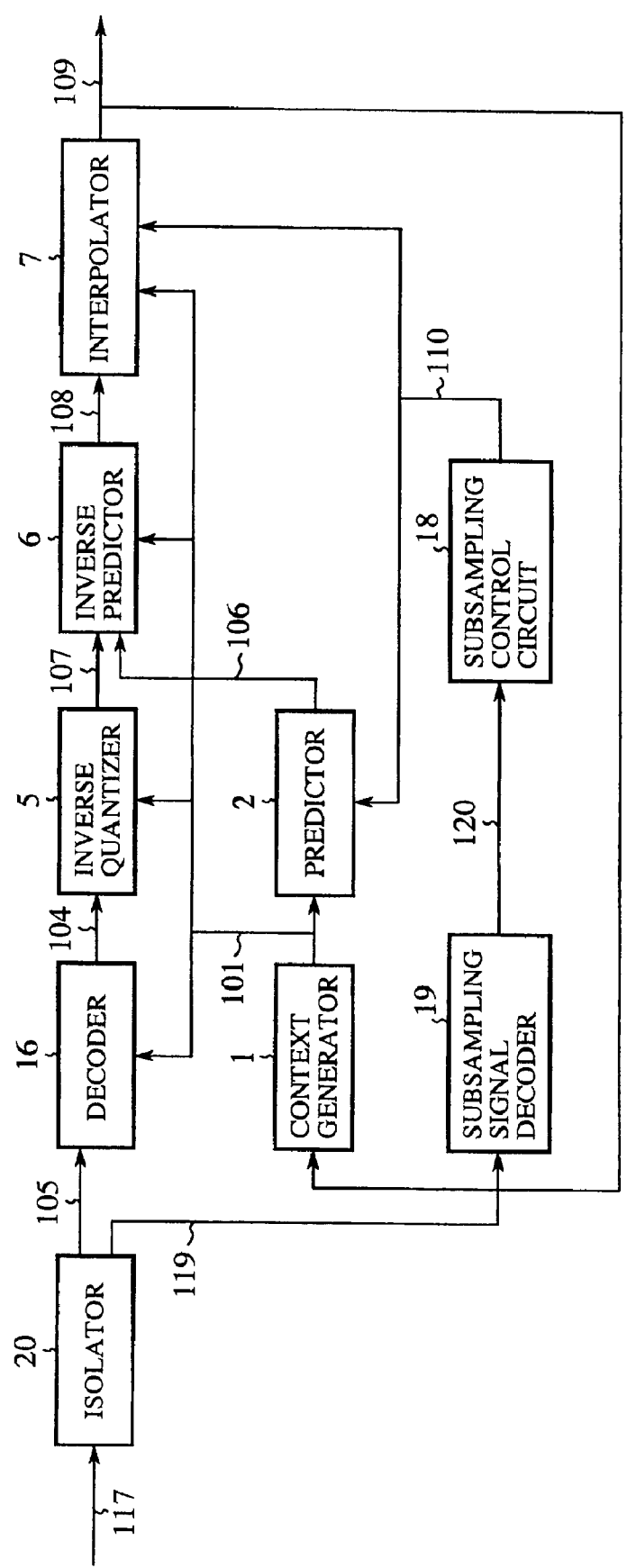
FIG. 7 shows a construction of an image signal coding apparatus according to a seventh embodiment of the present invention.

FIG. 7 shows a construction of the image signal decoding apparatus according to the seventh embodiment of the present invention. Referring to FIG. 7, a subsampling control signal decoder 19 decodes the subsampling control signal coded data 119. The other components of the apparatus of the seventh embodiment are the same as the corresponding components of the apparatus according to the fifth and sixth embodiments shown in FIGS. 5 and 6.

A description will now be given of the operation according to the seventh embodiment. The isolator 20 isolates the prediction error coded data 105 and the subsampling control signal coded data 119 from the mixed coded data 117 output, for example, from the image signal coding apparatus according to the third embodiment.

The prediction error coded data 105 is supplied to the decoder 16. The subsampling control signal decoder 19 outputs the decoded subsampling control signal 120. The other aspects of the seventh embodiment, including the generation of the reconstructed symbol 109, are the same as the corresponding aspects of the image signal coding apparatus according to the sixth embodiment. A description will now be given of the operation of the subsampling control signal decoder 19.

The subsampling control signal coded data 119 output from the isolator 20 is input to the subsampling control signal decoder 19 so as to be decoded therein. The subsampling control signal decoder 19 then outputs the decoded subsampling control signal 120. As described in the third embodiment, the subsampling control signal coded data 119 indicates the result of determination at the coding end as to whether subsampling should be effected using the coded pixel signal, the target symbol and the subsequently coded pixels. Accordingly, a tighter subsampling method control is effected in comparison with a case where only the previously coded pixel signal is used.

By using the subsampling control signal coded data 119, indicating the result of determination at the coding end as to whether the target pixel is subjected to subsampling, based on the coded pixel signal, the target symbol and the subsequently coded pixel signal, a tighter subsampling method control is effected.

As described, in addition to the components of the decoding apparatus according to the fifth embodiment, the decoding apparatus according to the seventh embodiment further comprises: a subsampling control signal decoder 19 decoding the subsampling control signal coded data 119 so as to generate the decoded subsampling control signal 120, wherein a determination is made as to whether interpolation should be performed, based on the decoded subsampling control signal 120.

The invention according to the seventh embodiment may also be implemented as a decoding method comprising the steps executed by the respective components of the decoding apparatus.

In addition the steps of the decoding method according to the fifth embodiment, the decoding method according to the seventh embodiment further comprises: a subsampling control signal decoding step for decoding the subsampling control signal coded data 119 so as to generate the decoded subsampling control signal 120, wherein a determination is made as to whether interpolation should be performed based on the decoded subsampling control signal 120.

Thus, the seventh embodiment is adapted for the subsampling method whereby the pixel value of the pixel y to be coded subsequent to the target pixel x for coding is referred to in determining whether the target pixel x should be regularly coded or subject to subsampling at the coding end. Accordingly, by incorporating a method of determination using not only the previously coded pixel signal but also the target pixel and the subsequent pixel, a tighter subsampling control is provided.

Eighth Embodiment

Figure 8:
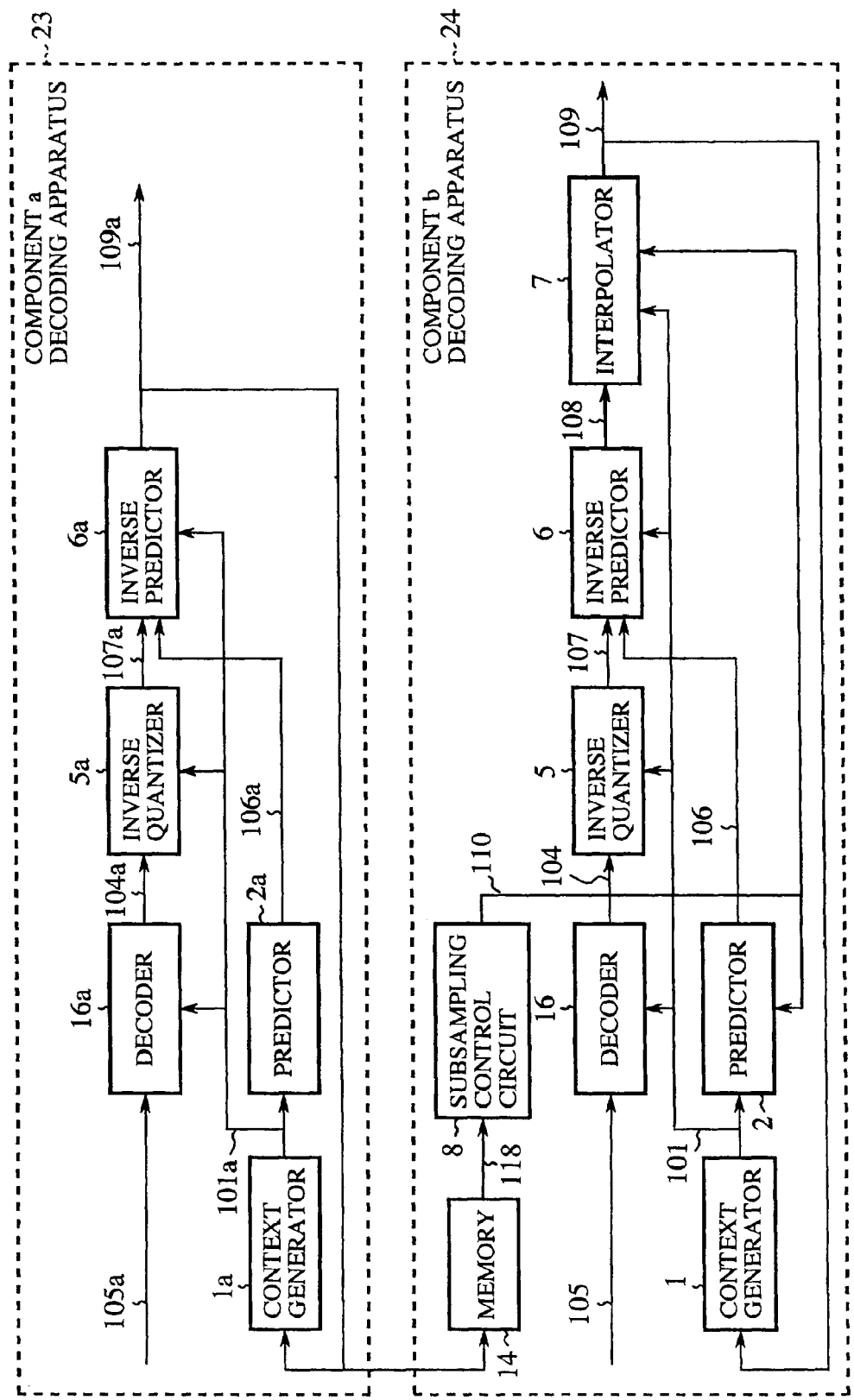
FIG. 8 shows a construction of an image signal coding apparatus according to an eighth embodiment of the present invention.
Figure 10:
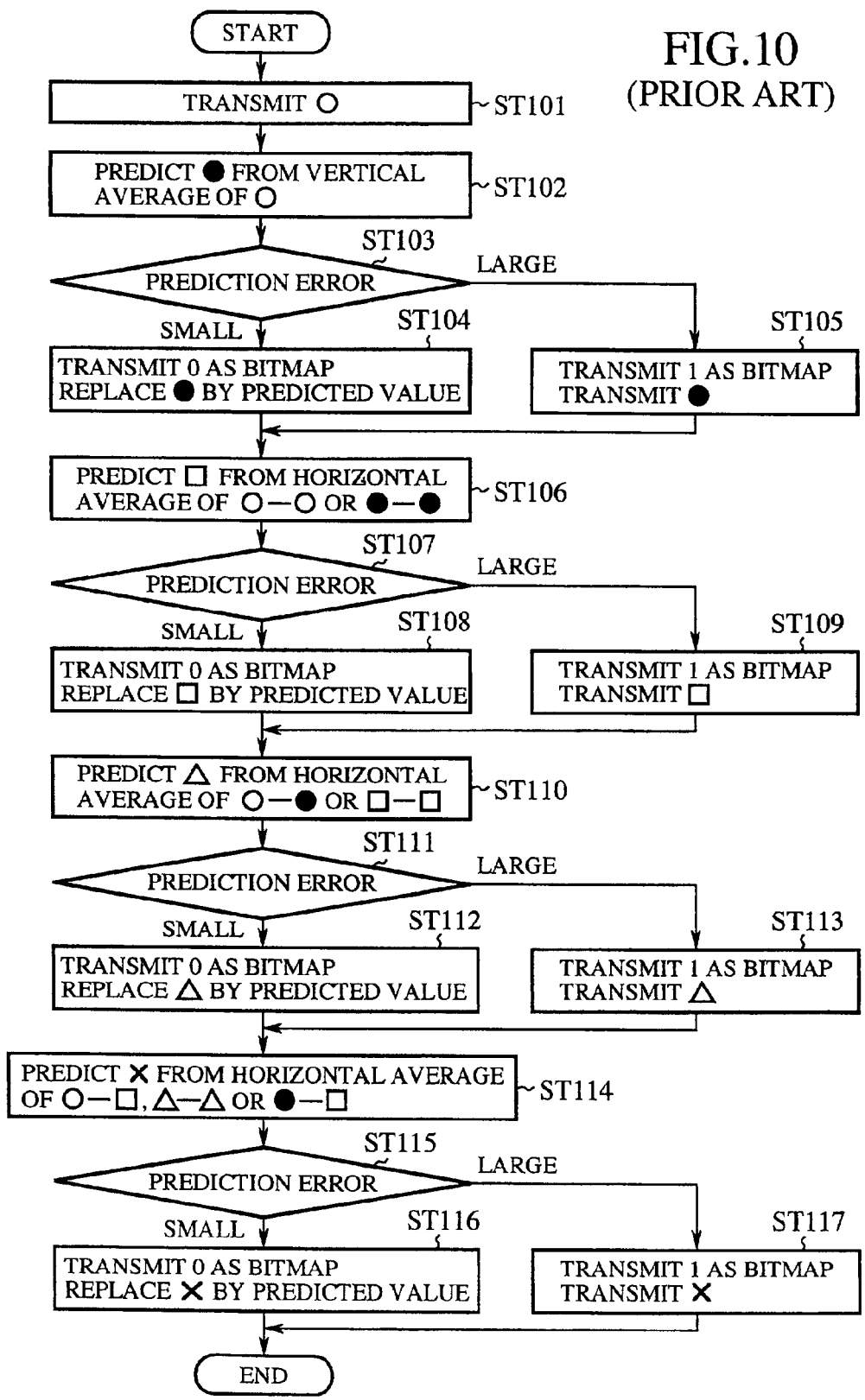
FIG. 10 is a flowchart for an encoder process for subsampling provided in a coding apparatus according to the related art.

FIG. 8 shows a construction of an image signal decoding apparatus according to an eighth embodiment of the present invention for decoding a luminance signal Y and color difference signals Cr/Cb independently. Referring to FIG. 8, a section in which suffixes a are used for reference indicates a decoding unit for the luminance signal Y (component a) and a section without suffixes indicates a decoding unit for the color difference signals Cr/Cb.

The coding unit for component a is configured such that those components of the decoding apparatus of the fifth embodiment related to subsampling, i.e. the interpolator 7 and the subsampling control circuit 8, are eliminated.

In the decoding unit for component b (Cr/Cb), the memory 14 stores the reconstructed symbol 109a indicating the reconstructed luminance signal, and the subsampling control circuit 8 determines, based on the neighborhood symbol 118 indicating the luminance signal of the adjacent pixel, whether the color difference signals Cr/Cb for a target pixel is subjected to subsampling at the coding end. A step related subsampling (interpolation) is performed based on the result of determination. In comparison with the decoding unit according to the fifth embodiment, the decoding unit for component b according to the eighth embodiment is characterized in that the memory 14 is added. The context signal 101 input to the subsampling control circuit 8 of the decoding apparatus of the fifth embodiment is replaced by the neighborhood symbol 118 from the memory 14. The other components of the eighth embodiment are the same as the corresponding components of the fifth embodiment.

The image signal decoding apparatus according to the eighth embodiment corresponds to the image signal coding apparatus according to the fourth embodiment. Accordingly, it is assumed that, at the coding end, the luminance signal Y is not subjected to subsampling and a determination as to whether the color difference signals Cr/Cb are subject to subsampling or regularly coded is made using the corresponding luminance signal Y (luminance signal Y of the target pixel to be coded or the adjacent reference pixel).

A description will now be given of the operation according to the eighth embodiment. The decoding unit for component a is configured such that those components of the coding apparatus of the fifth embodiment related to subsampling, i.e. the interpolator 7 and the subsampling control circuit 8, are eliminated. The pixel value from the luminance signal Y indicated by the prediction error coded data 105a input to the decoder 16 is decoded in a regular manner for all the pixels so that the result of decoding is output as the reconstructed coded symbol 109a.

In comparison with the decoding apparatus according to the fifth embodiment, the decoding unit for component b according to the eighth embodiment is characterized in that the memory 14 is added. The neighborhood symbol 118 is output from the memory 14 to the subsampling control circuit 8. The memory 14 is provided with a delaying function in the direction of arrangement of pixels and/or in the direction of lines. The memory 14 outputs the neighborhood symbol 118 containing the luminance signals Y of a reference pixel, a target pixel for coding and a subsequent pixel.

The subsampling control circuit 8 determines whether the color difference signals for the target pixel are subjected to subsampling or regularly coded at the coding end, based on the neighborhood symbol 118, so as to output the subsampling control signal 110 to control the step related to subsampling.

The operation of the other components including the context generator 1, the predictor 2, the inverse quantizer 5, the decoder 6, the inverse predictor 16 and the interpolator 7 is the same as the operation of the corresponding components of the fifth embodiment so that the description thereof is omitted.

In addition to the components of the decoding apparatus according to the fifth embodiment, the decoding apparatus according to the eighth embodiment further comprises: a second context generator 1a generating a context signal 110a from a reconstructed symbol 109a; a second predictor 2a generating a prediction signal 106a indicating a prediction value which is a prediction of a symbol 102a to be decoded, based on the context signal 110a; a second decoder 16a decoding coded data 105a by referring to the context signal 110a, so as to generate a quantized prediction error signal 104a; a second inverse quantizer 5a subjecting the quantized prediction error signal 104a to inverse quantization so as to generate a reconstructed prediction error signal 107a; and a second inverse predictor 6a subjecting the reconstructed prediction error signal 107a to inverse prediction so as to generate the reconstructed sampled signal 108a, wherein the second context generator 1a, the second predictor 2a, the second decoder 16a, the second inverse quantizer 5a and the second inverse predictor 6a constitute a decoding unit for component a, and the context generator 1, the predictor 2, the decoder 16, the inverse quantizer 5, the inverse predictor 6, the interpolator 7 and the subsampling control circuit 8 constitute a decoding unit for component b, and wherein the decoding unit for component b determines whether the symbol 102a corresponding to the reconstructed symbol 109a is subjected to subsampling at the coding end, using the reconstructed symbol 109a generated in the decoding unit for component a and the symbol adjacent to the reconstructed symbol 109a.

The invention according to the eighth embodiment may also be implemented by a decoding method comprising the steps executed by the respective components of the decoding apparatus.

In addition to the steps of the decoding method according to the fifth embodiment, the decoding method according to the eighth embodiment further comprises: a second context generating step for generating a context signal 110a from a reconstructed symbol 109a; a second predicting step for generating a prediction signal 106a indicating a prediction value which is a prediction of a symbol 102a to be decoded, based on the context signal 110a; a second decoding step for decoding coded data 105a by referring to the context signal 110a, so as to generate a quantized prediction error signal 104a; a second inverse quantization step for subjecting the quantized prediction error signal 104a to inverse quantization so as to generate a reconstructed prediction error signal 107a; and a second inverse prediction step for subjecting the reconstructed prediction error signal 107a to inverse prediction so as to generate the reconstructed sampled signal 108a, wherein the second context generating step, the second prediction step, the second decoding step, the second inverse quantization step and the second inverse prediction step constitute the decoding steps for component a, and the context generating step, the predicting step, the decoding step, the inverse quantization step, the inverse prediction step, the interpolation step and the subsampling control step constitute the decoding steps for component b, and wherein the decoding steps for component b determine whether the symbol 102a corresponding to the reconstructed symbol 109a is subjected to subsampling at the coding end, using the reconstructed symbol 109a generated in the decoding steps for component a and the symbol adjacent to the reconstructed symbol 109a.

The decoding of the eighth embodiment is adapted for subsampling whereby subsampling of the color difference signals Cr/Cb of a target pixel is controlled by using the luminance signal Y of the corresponding pixel, the luminance signal Y being regularly coded without being subjected to subsampling at the coding end. Accordingly, coupled with the associated coding apparatus, the decoding according to the eighth embodiment enables successful reduction in the code size while the quality of visual perception of the color difference signals Cr/Cb is prevented from being unfavorably affected, since the visual perception of human beings is characterized by a less sensitivity for the color difference signals Cr/Cb at a high frequency than for the luminance signal Y at the same frequency.

Ninth Embodiment

In the exemplary embodiments given above, adaptive subsampling is employed. However, the quantization may also be performed adaptively.

For example, a quantization control circuit may be provided in the apparatus according to the first embodiment so that variable methods of quantizing the prediction error are employed in the quantizer 3 depending on the context 101. Associated with this, the inverse quantizing method employed in the inverse quantizer 5 may also be controlled accordingly. Since the maximum value of the rank assigned to the prediction error and the probability of occurrence of a symbol vary according to the context, the efficiency in coding is improved by changing the coding method in accordance with the context.

With this, in addition to the advantages provided by the aforementioned embodiments, a tighter control of quantization error is enabled.

According to the ninth embodiment, in addition to the features of the coding apparatus according to the first embodiment, the quantizer and the inverse quantizer of the coding apparatus are provided with a function of switchably using a plurality of quantization methods and inverse quantization methods, respectively, and a quantization control circuit for controlling the plurality of quantization methods and inverse quantization methods is further provided.

The invention according to the ninth embodiment may also be implemented as a coding method comprising the steps executed by the respective components of the coding apparatus.

In a coding method according to the ninth embodiment, the quantizing step and the inverse quantization step include a step of switching between a plurality of quantization methods and inverse quantization methods, respectively, and a quantization control step for controlling the plurality of quantization methods and inverse quantization methods is further provided.

As described, the ninth embodiment is configured such that a quantization control circuit controls the quantization method and variable methods of quantizing the prediction error are employed in the quantizer 3 depending on the context 101. Accordingly, in addition to the advantages of the foregoing embodiments, a coding apparatus with a tighter control of quantization error is provided.

Tenth Embodiment

The tenth embodiment provides a decoding apparatus adapted for the coding apparatus according to the ninth embodiment.

For example, an inverse quantization control circuit for controlling the inverse quantization method may be introduced in the apparatus according to the fifth embodiment so that variable methods of subjecting the quantized prediction error to inverse quantization may be employed depending on the context signal 101. Since the maximum value of the rank assigned to the prediction error and the probability of occurrence of a symbol vary according to the context, the efficiency in decoding in the decoder 16 is improved by changing the decoding method in accordance with the context.

With this, in addition to the advantages provided by the aforementioned embodiments, a tighter control of quantization error is enabled.

According to the tenth embodiment, in addition to the features of the decoding apparatus according to the fifth embodiment, the inverse quantizer of the decoding apparatus is provided with a function of switchably using a plurality of inverse quantization methods, and an inverse quantization control circuit for controlling the plurality of inverse quantization methods is further provided.

The invention according to the tenth embodiment may also be implemented by a decoding method comprising the steps executed by the respective components of the decoding apparatus.

In a decoding method according to the tenth embodiment, the inverse quantization step includes a step of switching between a plurality of inverse quantization methods, and an inverse quantization control step for controlling the plurality of inverse quantization methods is further provided.

As described, the tenth embodiment is configured such that an inverse quantization control circuit controls the inverse quantization and variable methods of subjecting the quantized prediction error to inverse quantization are employed in the inverse quantizer 5 depending on the context 101. Accordingly, in addition to the advantages of the aforementioned embodiments, a decoding apparatus with a tighter control of quantization error is provided.

The present invention is not limited to the above-described embodiments, and variations and modifications may be made without departing from the scope of the present invention.

What is claimed is:

1. A coding apparatus comprising: a context generator generating a context signal from a reconstructed symbol;
   a predictor generating a prediction signal indicating a prediction value which is a prediction of a symbol to be coded, based on the context signal, and a prediction error signal which is a difference between the prediction value and the symbol;
   a quantizer generating a quantized prediction error signal by quantizing the prediction error signal;
   an encoder coding the quantized prediction error signal by referring to the context signal;
   an inverse quantizer subjecting the quantized prediction error signal to inverse quantization so as to generate a reconstructed prediction error signal;
   an inverse predictor subjecting the reconstructed prediction error signal to inverse prediction so as to generate a reconstructed sampled signal;
   a subsampling control circuit generating a subsampling control signal indicating whether or not the symbol should be subject to subsampling; and an interpolator referring to the subsampling control signal so as to subject to interpolation the reconstructed sampled signal corresponding to the symbol subject to subsampling, wherein the coding apparatus codes symbols while adaptively employing subsampling.

2. The coding apparatus according to claim 1, wherein the subsampling control circuit refers to the reconstructed symbol generated in the interpolator so as to determine whether the symbol to be coded should be subject to subsampling.

3. The coding apparatus according to claim 1, further comprising:
   a subsampling control signal encoder for coding the subsampling control signal so as to generate subsampling control signal coded data, wherein
   the subsampling control circuit determines whether the symbol should be coded, based on information source symbols including the symbol.

4. The coding apparatus according to claim 1, further comprising:
   at least one of a code size counter and a quantized error counter, the code size counter generating a code size count by counting the value indicated by prediction error coded data, and the quantization error signal counter counting the value indicated by a quantization error signal so as to generate a quantization error count;
   a subsampling method control circuit referring to at least one of the code size count and the quantization error count, so as to generate a subsampling method parameter and a subsampling method identification signal, the subsampling method parameter being provided for selection of a subsampling method, and the subsampling method identification signal identifying one of a plurality of methods of subsampling control provided in a subsampling control circuit; and
   a subsampling method encoder coding the subsampling method identification signal so as to generate subsampling method coded data.

5. The coding apparatus according to claim 1, further comprising:
   a second context generator generating a context signal from a reconstructed symbol;
   a second predictor generating, based on the context signal, a prediction signal indicating a prediction value which is a prediction of a symbol to be coded, and a prediction error signal which is a difference between the prediction value and the symbol;
   a second quantizer quantizing the prediction error signal so as to generate a quantized prediction error signal;
   a second encoder coding the quantized prediction error signal by referring to the context signal;
   a second inverse quantizer subjecting the quantized prediction error signal to inverse quantization so as to generate a reconstructed prediction error signal; and
   a second inverse predictor subjecting the reconstructed prediction error signal to inverse prediction so as to generate a reconstructed symbol,
   the second context generator, the second predictor, the second quantizer, the second encoder, the second inverse quantizer and the second inverse predictor constituting a coding unit for component a, and
   the context generator, the predictor, the quantizer, the encoder, the inverse quantizer, the inverse predictor, the interpolator and the subsampling control circuit constituting a coding section for component b.

6. The coding apparatus according to claim 1, wherein the encoder uses systematic Huffman code and be provided with a memory storing, for each context, information for determination of a type of coding used (order).

7. The coding apparatus according to claim 1, wherein the encoder uses arithmetic coding and be provided with a memory storing, for each context, information for determination of a type of coding used (span on a number line assigned to a symbol).

8. The coding apparatus according to claim 1, wherein, for each context, the encoder uses different memories depending on whether or not the symbol to be coded is subject to subsampling.

9. A decoding apparatus comprising:
   a context generator generating a context signal from a reconstructed symbol;
   a predictor generating a prediction signal which is a prediction of a symbol to be decoded, based on the context signal;
   a decoder decoding prediction error coded data by referring to the context signal so as to generate a quantized prediction error signal;
   an inverse quantizer subjecting the quantized prediction error signal to inverse quantization so as to generate a reconstructed prediction error signal;
   an inverse predictor subjecting the reconstructed prediction error signal to inverse prediction so as to generate a reconstructed sampled signal;
   a subsampling control circuit determining whether the prediction error coded data is subjected to subsampling at a coding end, based on the context signal, and generating a subsampling control signal indicating whether interpolation should be performed; and
   an interpolator subjecting to interpolation the reconstructed sampled signal corresponding to the prediction error coded data determined to be subjected to subsampling at the coding end, by referring to the subsampling control signal, wherein
   the decoder performs decoding of the prediction error coded data adaptively subjected to subsampling at the coding end.

10. The decoding apparatus according to claim 9, wherein the subsampling control circuit refers to the reconstructed symbol generated in the interpolator so as to determine whether interpolation should be performed.

11. The decoding apparatus according to claim 9, further comprising:

a subsampling control signal decoder decoding the subsampling control signal coded data so as to generate a decoded subsampling control signal, wherein a determination is made as to whether interpolation should performed, based on the decoded subsampling control signal.

12. The decoding apparatus according to claim 9, further comprising:
a subsampling method decoder decoding the subsampling method coded data so as to generate the subsampling identification signal, wherein
interpolation is performed by determining the subsampling method used at a coding end by referring to the subsampling identification signal.

13. The decoding apparatus according to claim 9, further comprising:
a second context generator generating a context signal from a reconstructed symbol;
a second predictor generating a prediction signal indicating a prediction value which is a prediction of a symbol to be decoded, based on the context signal;
a second decoder decoding coded data by referring to the context signal, so as to generate a quantized prediction error signal;
a second inverse quantizer subjecting the quantized prediction error signal to inverse quantization so as to generate a reconstructed prediction error signal; and
a second inverse predictor subjecting the reconstructed prediction error signal to inverse prediction so as to generate the reconstructed sampled signal,
the second context generator, the second predictor, the second decoder, the second inverse quantizer and the second inverse predictor constituting a decoding unit for component a, and
the context generator, the predictor, the decoder, the inverse quantizer, the inverse predictor, the interpolator and the subsampling control circuit constituting a decoding unit for component b, and wherein
the decoding unit for component b determines whether the symbol corresponding to the reconstructed symbol is subjected to subsampling at the coding end, using the reconstructed symbol generated in the decoding unit for component a and the symbol adjacent to the reconstructed symbol.

14. The decoding apparatus according to claim 9, wherein the decoder decodes using the systematic Huffman code and is provided with a memory storing, for each context, information for determination of a type of coding used (order).

15. The decoding apparatus according to claim 9, wherein the decoder uses arithmetic coding and is provided with a memory storing, for each context, information for determination of a type of coding used (span on a number line assigned to a symbol).

16. The decoding apparatus according to claim 9, wherein, for each context, the decoder uses different memories depending on whether or not the symbol to be decoded is subjected to subsampling at the coding end.

17. The coding apparatus according to claim 1, wherein the subsampling control circuit refers to second-derivatives of a plurality of symbols so as to determine whether or not the symbol to be coded should be subject to subsampling.

18. The coding apparatus according to claim 1, wherein the subsampling control circuit refers to Laplacians so as to determine whether the symbol to be coded should be subject to subsampling.

19. The decoding apparatus according to claim 9, wherein the subsampling control circuit refers to second-derivatives of a plurality of symbols so as to determine whether or not the symbol to be decoded is subjected to subsampling at the coding end.

20. The decoding apparatus according to claim 9, wherein the subsampling control circuit refers to Laplacians so as to determine whether the symbol to be decoded is subjected to subsampling at the coding end.

21. The coding apparatus according to claim 1, wherein the quantizer and the inverse quantizer are provided with a function of switchably using a plurality of quantization methods and inverse quantization methods, respectively, and a quantization control circuit for controlling the plurality of quantization methods and inverse quantization methods is further provided.

22. The decoding apparatus according to claim 9, wherein the inverse quantizer is provided with a function of switchably using a plurality of inverse quantization methods and a quantization control circuit for controlling the plurality of inverse quantization methods is further provided.

23. A coding method comprising:
a context generating step for generating a context signal from a reconstructed symbol;
a prediction step for generating a prediction signal which is a prediction of a symbol to be coded, based on the context signal, and a prediction error signal which is a difference between the prediction value and the symbol to be coded;
a quantizing step for quantizing the prediction error signal so as to generate a quantized prediction error signal;
a coding step for coding the quantized prediction error signal by referring to the context signal;
an inverse quantization step for subjecting the quantized prediction error signal to inverse quantization so as to generate a reconstructed prediction error signal;
an inverse prediction step for subjecting the reconstructed prediction error signal to inverse prediction so as to generate the reconstructed sampled signal;
a subsampling control step for generating a subsampling control signal for determining whether the symbol should be subject to subsampling; and
an interpolation step for subjecting to interpolation the reconstructed sampled signal corresponding to the symbol subject to subsampling, wherein
the coding method codes samples while adaptively employing subsampling.

24. The coding method according to claim 23, wherein the subsampling control step refers to the reconstructed symbol generated in the process of interpolation so as to determine whether the symbol to be coded should be subject to subsampling.

25. The coding method according to claim 23, further comprising:
a subsampling control signal coding step for coding the subsampling control signal so as to generate the subsampling control signal coded data, wherein
a determination is made as to whether the symbol should be coded, based on information source symbols including the symbol.

26. The coding method according to claim 24, further comprising:
one of two steps including a code size counting step and a quantization error counting step, the code size counting step counting the value indicated by the prediction error coded data so as to generate the code size count, and the quantization error counting step counting the value indicated by the quantization error signal so as to generate the quantization error count, the method further comprising:

a subsampling method control step for referring to at least one of the code size count and the quantization error count, so as to generate the subsampling method parameter and the subsampling method identification signal, the subsampling method parameter being provided for selection of a subsampling method, and the subsampling method identification signal identifying one of a plurality of methods of subsampling control provided in a subsampling control circuit; and a subsampling method coding step for coding the subsampling method identification signal so as to generate subsampling method coded data.

27. The coding method according to claim 24, further comprising:

a second context generating step for generating a context signal from a reconstructed symbol;

a second prediction step for generating a prediction value which is a prediction of a symbol based on the context signal, and a prediction error signal which is a difference between the prediction value and the symbol;

a second quantizing step for quantizing the prediction error signal so as to generate the quantized prediction error signal; a second coding step for coding the quantized prediction error signal by referring to the context signal; a second inverse quantization step for subjecting the quantized prediction error signal to inverse quantization so as to generate a reconstructed prediction error signal; and a second inverse prediction step for subjecting the reconstructed prediction error signal to inverse prediction so as to generate the reconstructed symbol, the second context generating step, the second prediction step, the second quantizing step, the second coding step, the second inverse quantization step, the second inverse prediction step constituting the coding steps for component a, and the context generating step, the prediction step, the quantization step, the coding step, the inverse quantization step, the inverse prediction step, the interpolation step and the subsampling control step constituting the coding steps for component b, and in the coding steps for component b, a determination is made as to whether the symbol corresponding to the reconstructed symbol should be coded, using the reconstructed symbol and adjacent symbols generated by the coding steps for component a.

28. The coding method according to claim 23, wherein the coding step uses the systematic Huffman code and stores, for each context, information for determination of a type of coding (order) to be used.

29. The coding method according to claim 23, wherein the coding step uses arithmetic coding and stores, for each context, information for determination of a type of coding (span on a number line assigned to a symbol).

30. The coding method according to claim 23, wherein, for each context, the coding step uses different memories depending on whether or not the symbol to be coded is subject to subsampling.

31. A decoding method comprising:

a context generating step for generating a context signal from a reconstructed symbol;

a predicting step for generating a prediction signal which is a prediction of a symbol to be decoded, based on the context signal;

a decoding step for decoding prediction error coded data by referring to the context signal so as to generate a quantized prediction error signal;

an inverse quantization step for subjecting the quantized prediction error signal to inverse quantization so as to generate a reconstructed prediction error signal;

an inverse prediction step for subjecting the reconstructed prediction error signal to inverse prediction so as to generate a reconstructed sampled signal;

a subsampling control step for determining whether the prediction error coded data is subjected to subsampling at a coding end, based on the context signal, and generating a subsampling control signal indicating whether interpolation should be performed; and an interpolating step for reconstructing a signal determined to be subjected to subsampling at the coding end, by referring to the subsampling control signal, wherein the decoding method performs decoding of the prediction error coded data adaptively subjected to subsampling at the coding end.

32. The decoding method according to claim 31, wherein the subsampling control step determines whether interpolation should be performed by referring to the reconstructed symbol generated in the interpolating step.

33. The decoding method according to claim 31, further comprising:

a subsampling control signal decoding step for decoding the subsampling control signal coded data so as to generate the decoded subsampling control signal, wherein a determination is made as to whether interpolation should be performed based on the decoded subsampling control signal.

34. The decoding method according to claim 31, further comprising:

a subsampling method decoding step for decoding the subsampling method coded data so as to generate the subsampling method identification signal, wherein interpolation is performed by determining the subsampling method used at a coding end by referring to the subsampling identification signal.

35. The decoding method according to claim 31, further comprising:

a second context generating step for generating a context signal from a reconstructed symbol;

a second prediction step for generating a prediction value which is a prediction of a symbol based on the context signal, and a prediction error signal which is a difference between the prediction value and the symbol;

a second quantizing step for quantizing the prediction error signal so as to generate the quantized prediction error signal;

a second coding step for coding the quantized prediction error signal by referring to the context signal;

a second inverse quantization step for subjecting the quantized prediction error signal $104a$ to inverse quantization so as to generate a reconstructed prediction error signal; and a second inverse prediction step for subjecting the reconstructed prediction error signal to inverse prediction so as to generate the reconstructed symbol, the second context generating step, the second prediction step, the second quantizing step, the second coding step, the second inverse quantization step, the second inverse prediction step constituting the coding steps for component a, and the context generating step, the prediction step, the quantization step, the coding step, the inverse quantization step, the inverse prediction step, the interpolation step and the subsampling control step constituting the coding steps for component b, and wherein in the coding steps for component b, a determination is made as to whether the symbol corresponding to the reconstructed symbol should be coded, using the reconstructed symbol 109a and adjacent symbols generated by the coding steps for component a.

36. The decoding method according to claim 31, wherein the decoding step decodes using the systematic Huffman code and stores, for each context, information for determination of a type of coding used (order).

37. The decoding method according to claim 31, wherein the decoding step uses arithmetic coding and stores, for each context, information for determination of a type of coding used (span on a number line assigned to a symbol).

38. The decoding method according to claim 31, wherein, for each context, the decoding step uses different memories depending on whether or not the symbol to be decoded is subjected to subsampling at the coding end.

39. The coding method according to claim 23, wherein the subsampling control step refers to second-derivatives of a plurality of symbols so as to determine whether or not the symbol to be coded should be subject to subsampling.

40. The decoding method according to claim 31, wherein the subsampling control step refers to second-derivatives of a plurality of symbols so as to determine whether or not the symbol to be decoded is subjected to subsampling at the coding end.

41. The coding method according to claim 23, wherein the subsampling control step refers to Laplacians so as to determine whether the symbol to be coded should be subject to subsampling.

42. The decoding method according to claim 31, wherein the subsampling control step refers to Laplacians so as to determine whether the symbol to be coded is subjected to subsampling at the coding end.

43. The coding method according to claim 23, wherein the quantizing step and the inverse quantization step include a step of switching between a plurality of quantization methods and inverse quantization methods, respectively, and a quantization control step for controlling the plurality of quantization methods and inverse quantization methods is further provided.

44. The decoding method according to claim 31, wherein the inverse quantization step includes a step of switching between a plurality of inverse quantization methods, and an inverse quantization control step for controlling the plurality of inverse quantization methods is further provided.

* * * * *